US011305393B2

(12) United States Patent
Machida

(10) Patent No.: US 11,305,393 B2
(45) Date of Patent: Apr. 19, 2022

(54) DUST COLLECTOR AND WORK TOOL PROVIDED WITH DUST COLLECTOR

(71) Applicant: MAKITA CORPORATION, Anjo (JP)

(72) Inventor: Yoshitaka Machida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 68 days.

(21) Appl. No.: 16/869,630

(22) Filed: May 8, 2020

(65) Prior Publication Data

US 2020/0269376 A1 Aug. 27, 2020

Related U.S. Application Data

(62) Division of application No. 15/118,263, filed as application No. PCT/JP2015/054329 on Feb. 17, 2015, now Pat. No. 10,688,613.

(30) Foreign Application Priority Data

Feb. 17, 2014 (JP) .................. 2014-027782
Feb. 17, 2014 (JP) .................. 2014-027784
Feb. 17, 2014 (JP) .................. 2014-027786

(51) Int. Cl.
*B23Q 11/00* (2006.01)
*B25F 5/00* (2006.01)

(52) U.S. Cl.
CPC ...... *B23Q 11/0071* (2013.01); *B23Q 11/0046* (2013.01); *B25F 5/00* (2013.01); *B25F 5/008* (2013.01)

(58) Field of Classification Search
CPC ... B23Q 11/0071; B23Q 11/0046; B25F 5/00; B25F 5/008

USPC .......................................... 173/198
See application file for complete search history.

(56) References Cited

U.S. PATENT DOCUMENTS

| 6,514,131 | B1 | 2/2003 | Reich et al. |
| 8,424,615 | B2 | 4/2013 | Baumann et al. |
| 2004/0231871 | A1 | 11/2004 | Arich et al. |
| 2013/0055523 | A1* | 3/2013 | Yoshikane ......... B23Q 11/0046 15/347 |

FOREIGN PATENT DOCUMENTS

| DE | 3516099 A1 | 11/1986 |
| EP | 1 872 899 A1 | 1/2008 |
| EP | 2368666 A2 | 9/2011 |
| JP | S53-139196 A | 12/1978 |

(Continued)

OTHER PUBLICATIONS

Apr. 21, 2015 International Search Report issued in International Patent Application No. PCT/JP2015/054329.

(Continued)

*Primary Examiner* — Michelle Lopez
(74) *Attorney, Agent, or Firm* — Oliff PLC

(57) ABSTRACT

To provide an improved technique for improving operability in an operation using a power tool with a dust collector attached thereto, a hammer drill to which a dust collector is attached has a body and a handle. The dust collector has a dust collecting part and a male plug. The dust collector is attached to the hammer drill by connecting the male plug to the handle of the hammer drill.

16 Claims, 14 Drawing Sheets

(56) References Cited

FOREIGN PATENT DOCUMENTS

| | | |
|---|---|---|
| JP | H02-100787 U | 8/1990 |
| JP | H04-181666 A | 6/1992 |
| JP | H06-58572 U | 8/1994 |
| JP | 2001-029273 A | 2/2001 |
| JP | 2003-500227 A | 1/2003 |
| JP | 2011-136209 A | 7/2011 |
| JP | 2011-189485 A | 9/2011 |
| WO | 2013/122108 A1 | 8/2013 |

OTHER PUBLICATIONS

Jun. 26, 2017 Office Action issued in Japanese Patent Application No. 2014-027782.
Jun. 26, 2017 Office Action issued in Japanese Patent Application No. 2014-027784.
Jun. 26, 2017 Office Action issued in Japanese Patent Application No. 2014-027786.
Aug. 23, 2016 International Preliminary Report on Patentability issued in International Patent Application No. PCT/JP2015/054329.

\* cited by examiner

DUST COLLECTOR AND WORK TOOL PROVIDED WITH DUST COLLECTOR

This is a Division of application Ser. No. 15/118,263 filed Aug. 11, 2016, which claims the benefit of Japanese Patent Application Nos. 2014-027782, 2014-027784, and 2014-027786 filed Feb. 17, 2014, respectively. The disclosure of the prior applications is hereby incorporated by reference herein in its entirety.

TECHNICAL FIELD

The present invention relates to a dust collector attached to a power tool and a power tool having the dust collector.

BACKGROUND ART

European Patent Application Publication (EP-A1) No. 1872899 discloses a power tool having a dust collector. The power tool has a tool accessory that is coupled to a front end region of a tool body, and a handle that is connected to a rear end region of the tool body. The dust collector is attached to the tool body substantially in an intermediate region of the power tool between the tool accessory and the handle.

SUMMARY OF THE INVENTION

Problems to be Solved by the Invention

Like in the above-described power tool, when the dust collector is attached on the tool accessory side distant from the handle, the center of gravity of the power tool having the dust collector is displaced to the tool accessory side with respect to that of the power tool without the dust collector attached thereto. For a user holding the power tool by gripping the handle, when the center of gravity of the power tool with the dust collector attached thereto is displaced apart from the handle, the load on the user's hand holding the power tool may increase.

Accordingly, it is an object of the present invention to provide an improved technique relating to attachment of a dust collector to a power tool in order to improve operability in an operation using a power tool with a dust collector attached thereto.

Means for Solving the Problem

The above-described problem is solved by the present invention. According to a preferred aspect of the present invention, a dust collector for collecting dust generated during an operation is provided which is integrally attached to a power tool for performing the operation on a workpiece and can be carried together with the power tool. Particularly, it is an object of the present invention to provide an improved technique relating to attachment of the dust collector to the power tool. The power tool to which the dust collector is attached has a tool body having a front end region to which a tool accessory having a prescribed axis is coupled, and a handle that is connected to a rear end region of the tool body distant from the front end region. The dust collector has a dust collecting part having an opening for collecting dust, and a body that is connected to the dust collecting part and the handle of the power tool. The dust collecting part is typically arranged in a position corresponding to and adjacent to the tool accessory in order to collect dust, and preferably arranged to surround the tool accessory. The dust collector is attached to the power tool by connecting the body to the handle. By attaching the dust collector to the power tool, the portable dust collector is provided which can be carried together with the power tool by a user. Further, the body preferably has at least one of a dust passage through which dust collected in the dust collecting part passes, a dust storing part for storing the dust, and a dust transferring mechanism for transferring the dust from the dust collecting part to the dust storing part. The dust collector may be connected not only to the handle but also to a region of the power tool other than the handle. Further, the handle of the power tool is preferably configured as a main handle which is provided on the tool body so as not to be detached.

According to the present invention, the dust collector is attached to the power tool by connecting to the handle. Therefore, compared with a structure in which the dust collector is not connected to the handle, the center of gravity of the dust collector is located closer to the handle. Thus, the center of gravity of the whole power tool with the dust collector attached thereto can be prevented from being located apart from the handle, or it is located close to the handle, so that the load on the user who holds the power tool by gripping the handle is reduced. As a result, operability for a user during operation is improved. Further, in the structure in which the dust collector is connected not only to the handle but to any other region of the power tool, the dust collector is connected to the power tool at plural points, so that the dust collector is stably attached to the power tool.

According to a further aspect of the dust collector of the present invention, the body has a handle connection part that is connected to the handle, a dust collector motor and a fan that is rotated by the dust collector motor, and the body collects dust through the opening of the dust collecting part by utilizing an air flow generated by rotation of the fan. Specifically, the dust collector motor and the fan are provided as a dust transferring mechanism. The dust collector attached to the power tool is supplied with power from the handle via the handle connection part, so that the dust collector motor is driven. The manner of supplying power to the power tool suitably includes a manner in which power is supplied from an external power source via a power cable, and a manner in which the power tool is provided with a battery mounting part and power is supplied from a battery mounted to the battery mounting part. Therefore, power is supplied from the external power source or the battery to the dust collector connected to the handle via a wiring and a power feeding terminal which are provided in the handle.

Generally, the handle to be held by a user is formed into a size (thickness) suitable for a user to hold the handle. Therefore, relatively large components for driving the tool accessory such as a driving mechanism are disposed in a region of the power tool other than the handle. Thus, a free space is relatively easily formed inside the handle. According to this aspect, with the structure in which power is supplied to the dust collector via the handle, the wiring for feeding power to the dust collector is disposed inside the handle, so that a space inside the handle which is liable to be a free space is efficiently utilized. Further, mechanical components such as the driving mechanism and electrical components such as the wiring and the connection terminal are rationally arranged apart from each other.

According to a further aspect of the dust collector of the present invention, the dust collector has a tool body connection part that is connected to the body and the tool body of the power tool. The dust collector is mechanically connected to the tool body via the tool body connection part and mechanically and electrically connected to the handle via the handle connection part. The tool body connection part preferably has a recess or projection which engages with the tool body. Further, preferably, one of the handle connection part and the handle has a male terminal, while the other has a female terminal, and the handle connection part and the handle are mechanically and electrically connected to each other by engagement between the male terminal and the female terminal.

According to this aspect, the dust collector is connected to the handle and the tool body of the power tool, so that the dust collector is stably held by the power tool.

According to a further aspect of the dust collector of the present invention, a space forming part (also referred to as a region forming part) is provided in the body such that a prescribed space (also referred to as a prescribed region) is formed surrounded by the body, the handle and the tool body when the dust collector is attached to the power tool. Typically, the body, the handle and the tool body are arranged on a single plane, and the space surrounded by the body, the handle and the tool body is formed on this plane. Therefore, this space (also referred to as a closed space) communicates with the outside in a direction perpendicular to this plane. Preferably, it is configured such that user's fingers holding the handle are placed in this closed space or such that cooling air is discharged from the inside of the tool body into this closed space.

According to this aspect, the space surrounded by the body, the handle and the tool body is formed. Therefore, in the case of a structure in which the handle is formed such that user's fingers are placed in this space, the body of the dust collector and the tool body of the power tool protect the user's fingers against scattering of the workpiece. Further, in the case of a structure in which an outlet for discharging the cooling air from the power tool is open to this space, the dust collector does not block the outlet when the dust collector is attached to the power tool. Specifically, the cooling air is not prevented from being discharged, so that the power tool is rationally cooled by the cooling air.

According to a further aspect of the dust collector of the present invention, the handle of the power tool has a grip part that is connected to a prescribed first part of the tool body and extends in a prescribed direction, and a connection part that connects a distal end of the grip part distant from the tool body and a second part of the tool body which is different from the first part. The handle is configured such that a second space (also referred to as a second region) is formed surrounded by the grip part, the connection part and the tool body. The handle connection part of the dust collector is connected to the connection part of the handle. Typically, the grip part, the connection part and the tool body are arranged on a single plane, and the second space surrounded by the grip part, the connection part and the tool body is formed on the plane. Further, the second space (also referred to as a second closed space) preferably communicates with the outside in a direction perpendicular to this plane.

According to this aspect, the connection part is configured as a region which reinforces the grip part and to which the dust collector is attached. In other words, the connection part has a function as a reinforcing part for reinforcing the grip part and a function as a dust collector mounting part for mounting the dust collector. For this purpose, the dust collector is connected to a region of the handle other than the grip part, so that the dust collector does not interfere with a user's hand holding the grip part during operation.

According to a further aspect of the dust collector of the present invention, the dust collector is attached to the power tool by sliding in parallel to an axial direction of the tool accessory with respect to the tool body. Typically, by sliding the dust collector with respect to the power tool from the front end region toward the rear end region of the power tool, the handle connection part of the dust collector is connected to the handle of the power tool so that the dust collector is attached to the power tool. Further, preferably, the operation of attaching the dust collector to the power tool and connection between the handle connection part and the handle are completed substantially at the same time.

According to a preferred aspect of the present invention, a power tool having the above-described dust collector is provided. The power tool has a driving mechanism motor that is housed in the tool body, and a driving mechanism that is driven by the driving mechanism motor and drives the tool accessory. The driving mechanism suitably includes a rotation transmitting mechanism that rotates the tool accessory by transmitting rotation of the motor to the tool accessory, a crank mechanism that converts rotation of the motor into linear motion, and a linear motion transmitting mechanism that transmits linear motion converted by the crank mechanism to the tool accessory. The handle is configured to extend in a crossing direction crossing the axial direction of the tool accessory. Typically, the driving mechanism motor is arranged such that its rotation axis extends in parallel to the axial direction of the tool accessory. Further, the rotation axis of the motor may be arranged to extend substantially in parallel to the axial direction of the tool accessory.

According to a further aspect of the power tool of the present invention, the tool body has a first connection part extending in parallel to the axial direction of the tool accessory. The tool body connection part of the dust collector has an engagement part that engages with the first connection part so as to be slidable in the axial direction of the tool accessory. Typically, one of the first connection part and the engagement part is formed by a projection and the other of the first connection part and the engagement part is formed by a recess. Further, the handle has a second connection part to which the handle connection part of the dust collector is connected. The handle connection part of the dust collector is connected to the second connection part of the handle by sliding the engagement part from the tool accessory side toward the handle side substantially in parallel to the axial direction of the tool accessory with respect to the first connection part. Therefore, when the first connection part and the engagement part are engaged with each other and the dust collector is slid with respect to the power tool, the handle connection part of the dust collector is connected to the second connection part of the handle.

According to this aspect, the second connection part and the handle connection part are connected to each other by sliding the first connection part and the engagement part with respect to each other. Specifically, the dust collector is connected to the handle of the power tool by sliding the dust collector with respect to the tool body of the power tool. In other words, sliding of the first connection part and the engagement part and connection between the second connection part and the handle connection part are completed as a series of mounting operation. As a result, any complicated mounting operation is not required to attach the dust collector to the power tool, so that the efficiency in attaching the dust collector is improved.

According to a further aspect of the power tool of the present invention, a trigger for driving the driving mechanism motor is provided in the handle. The trigger is configured to protrude into a space (closed space) surrounded by the body, the handle and the tool body when the dust collector is attached to the power tool.

According to this aspect, user's fingers are placed in the space (closed space) in order to operate the trigger. With the structure in which the space is surrounded by the body, the handle and the tool body, the user's fingers are protected by the body, the handle and the tool body against scattering of the workpiece.

According to a further aspect of the power tool of the present invention, the power tool has a cooling fan that is driven by the driving mechanism motor. The tool body has an outlet through which cooling air generated by driving of the cooling fan is discharged to the outside of the tool body. The outlet is open to the space surrounded by the body, the handle and the tool body.

According to this aspect, the space surrounded by the body, the handle and the tool body is formed. Therefore, in the case of a structure in which the handle is formed such that user's fingers are placed in this space, the body of the dust collector and the tool body of the power tool protect the user's fingers against scattering of the workpiece. Further, in the case of a structure in which an outlet for discharging the cooling air from the power tool is provided facing this space, the dust collector does not block the outlet when the dust collector is attached to the power tool. Specifically, the cooling air is not prevented from being discharged, so that the power tool is rationally cooled by the cooling air.

According to another preferred aspect of the present invention, a power tool is provided which has an auxiliary machine mounting part to which an auxiliary machine is detachably mounted. It is an object of the present invention to provide an improved technique for enhancing the dust-proofing performance of a mounting part of the power tool to which the auxiliary machine is attached. The power tool is driven together with the auxiliary machine in a first drive mode of driving a tool accessory with the auxiliary machine attached to the auxiliary machine mounting part. The first drive mode is also referred to as a main mode. Further, the power tool has a second drive mode of driving the tool accessory without the auxiliary machine attached to the auxiliary machine mounting part. Specifically, in the second drive mode, only the power tool is driven. The second drive mode is also referred to as a sub-mode. The power tool can be driven in the first and second drive modes by selectively switching between the drive modes. Typically, the first and second drive modes are selectively switched according to user's manual operation of attaching the auxiliary machine. Further, the power tool may be provided with a detecting means for detecting the auxiliary machine and configured such that the first and second drive modes may be switched based on the detection result of the detecting means. Further, the auxiliary machine in the present invention suitably includes devices to be attached to the power tool, such as the dust collector, a lighting device, a laser irradiation device and an information display.

The above-described auxiliary machine mounting part of the power tool has a female part that is provided with an opening part having an opening into which a male part of the auxiliary machine is inserted, and engages with the male part, and an opening sealing member that can be moved between a sealing position for sealing the opening of the female part and an open position for opening the opening of the female part. Typically, the auxiliary machine has a projection configured as the male part, while the power tool has a recess configured as the opening of the female part, and the projection and the recess are engaged and electrically and/or mechanically connected to each other. The opening part has a prescribed opening forming member and an opening formed in the opening forming member. Further, the number of the openings is not limited to one, but a plurality of openings may be formed. The sealing position is set as a position in which the opening sealing member is flush with an opening edge of the opening, or a position in which the opening sealing member protrudes from the opening edge to the outside of the female part. Specifically, the opening sealing member comes in contact with the opening edge in an outer surface of the opening and thus seals the opening. The open position is set as a position inward of the opening edge inside the female part. In the first drive mode, the opening sealing member is located at the open position to open the opening and the male part of the auxiliary machine engages with the female part through the opening. Further, in the second drive mode, the opening sealing member is located at the sealing position to seal the opening.

According to this invention, the sealing position is set to a position where the opening sealing member is flush with the opening edge of the opening or a position where it protrudes from the opening edge to the outside of the female part. If, unlike in the present invention, it is configured such that the sealing position of the opening sealing member is set inward of the opening edge inside the female part, a recess is formed using the opening sealing member as a bottom in the opening, so that dust is easily accumulated in the opening. However, in the present invention, when located at the sealing position, the opening sealing member is flush with the opening edge of the opening, or it protrudes from the opening edge to the outside of the female part, so that any space which allows dust to be accumulated is not formed in the opening. With such a structure, when the opening sealing member is located at the open position, dust is prevented from entering the power tool or particularly the inside of the female part through the opening.

According to a further aspect of the power tool of the present invention, the female part has a female terminal that extends in a prescribed first direction crossing a plane defined by the opening edge and engages with a male terminal of the male part. Specifically, the female terminal extends inward from the opening side in the female part in the prescribed first direction. In the first drive mode, the male terminal and the female terminal are electrically connected by engaging with each other. Specifically, the female terminal has a metal terminal and is connected to the metal male terminal.

According to this aspect, the power tool and the auxiliary machine are electrically connected to each other by electrical connection between the male terminal and the female terminal, so that power can be supplied from the power tool to the auxiliary machine. Therefore, the auxiliary machine is driven while being integrally held with the power tool.

According to a further aspect of the power tool of the present invention, the opening sealing member can be moved in both the first direction and the crossing direction crossing the first direction with respect to the opening part. Preferably, the opening sealing member moves simultaneously in both the first direction and the crossing direction with respect to the opening part. Specifically, preferably, the opening sealing member moves in an oblique direction with respect to the first direction. The movement of the opening sealing member in the first direction and in the crossing direction may be independently performed.

According to this aspect, with the structure in which the opening sealing member is moved in both the first direction and the crossing direction crossing the first direction, the opening sealing member is rationally moved in the first direction to seal and open the opening and moved in the crossing direction to allow entry of the male part when the male part is inserted into the opening. Particularly, when the opening sealing member is moved simultaneously in the first direction and the crossing direction, the movement of the opening sealing member (movement in the oblique direction) is more rationally and efficiently achieved.

According to a further aspect of the power tool of the present invention, when the auxiliary machine is attached to the power tool, the opening sealing member moves from the sealing position to the open position so that the opening is opened. Preferably, when the auxiliary machine is attached to the power tool, the male part comes in contact with the opening sealing member and moves the opening sealing member from the sealing position to the open position so that the opening is opened. Further, it may also be configured such that, before the male part is inserted into the opening when the auxiliary machine is attached, the auxiliary machine detecting means provided in the power tool controls an opening sealing member operation means provided in the power tool to move the opening sealing member.

According to this aspect, with the structure in which the opening sealing member is moved from the sealing position to the open position when the auxiliary machine is attached, the timing when the opening sealing member opens the opening is optimized. Further, in the case of the structure in which, when the auxiliary machine is attached to the power tool, the male part comes in contact with the opening sealing member and moves the opening sealing member from the sealing position to the open position, the male part serves as the opening sealing member operation means. Therefore, it is not necessary to additionally provide the opening sealing member operation means in the power tool, so that the parts count of the power tool is reduced.

According to a further aspect of the power tool of the present invention, the opening part has a plurality of openings and partition walls between the openings. In the second drive mode, the opening sealing member located at the sealing position seals the openings with the partition walls exposed to the outside. Typically, an opening forming member which forms the openings is fixed to the power tool, and the partition walls are formed between the openings by providing the openings in the opening forming member.

According to this aspect, with the structure in which the opening sealing member seals the openings with the partition walls exposed to the outside, the opening sealing member does not need to cover (seal) the partition walls, so that the opening sealing member is formed corresponding to the size of the openings. Therefore, the opening sealing member is capable of individually opening and sealing the plural openings, so that the openings corresponding to the number of the male terminals of the male part can be opened and sealed.

According to a further aspect of the present invention, the power tool is provided with the auxiliary machine. Preferably, the auxiliary machine is configured as a dust collector having a dust collector motor and a fan that is rotated by the dust collector motor. In the first drive mode, the power tool supplies power to the dust collector so that the dust collector motor is driven.

According to this aspect, with the structure in which power can be supplied from the power tool to the auxiliary machine in the form of the dust collector, the dust collector can be driven when attached to the power tool. Thus, the dust collector is rationally driven according to the driving of the power tool.

According to another preferred aspect of the present invention, a dust collector for collecting dust generated during an operation is provided which is integrally attached to a power tool for performing the operation on a workpiece and can be carried together with the power tool. It is an object of the present invention to provide an improved technique relating to cooling a controller of the dust collector attached to the power tool. The dust collector has a dust collector motor, a fan that is rotationally driven by the dust collector motor, a controller for controlling the dust collector motor, a dust collecting part having an opening through which the dust is collected, a dust storing part for storing the dust collected through the opening, and a dust transferring part through which the dust is transferred from the dust collecting part to the dust storing part. An air flow which is generated by rotation of the fan driven by the dust collector motor is utilized to cool the controller as well as to collect the dust through the dust collecting part and transfer the dust to the dust storing part. Further, it may be configured such that, in the air flow generated by rotation of the fan, the air which has transferred dust further cools the controller. Alternatively, it may be configured such that the air flow is separated into an air flow for transferring dust and an air flow for cooling the controller.

According to this invention, the air flow generated by rotation of the fan does not only collect dust, but also cools the controller. Therefore, it is not necessary to separately provide a fan for collecting dust and a fan for cooling the controller, so that the parts count of the dust collector is reduced.

According to a further aspect of the dust collector of the present invention, the dust collector has a driving mechanism housing part that is connected to the dust storing part and houses the dust collector motor and the controller, and a filter arranged between the dust storing part and the driving mechanism housing part. The air which has transferred dust to the dust storing part and passed through the filter cools the controller.

According to this aspect, the controller is cooled after dust in the air flow is caught by the filter. Therefore, the influence of dust in the cooling air on the controller is suppressed.

According to a further aspect of the dust collector of the present invention, the controller is arranged between the filter and the fan such that the air generated by rotation of the fan passes through the filter, the controller and the fan in this order. The controller is arranged such that the air led into the dust collector through the opening passes through the filter, the controller and the fan in this order and is discharged to the outside of the dust collector. For this purpose, the arrangement of the controller suitably includes a manner in which the controller is arranged between the filter and the fan in the direction of the air flow, and a manner in which the controller is arranged in a physical position between the filter and the fan in a prescribed axial direction.

According to a further aspect of the dust collector of the present invention, the driving mechanism housing part has an airflow path through which air flows from the filter to the fan. The controller forms at least part of an airflow path defining wall that defines the airflow path, so that the air flows along a surface of the controller. Further, the controller preferably has a metal heat radiating plate which forms the airflow path.

According to this aspect, with the structure in which the controller forms the airflow path, the controller is efficiently cooled. Further, the controller has a function of controlling the driving of the dust collector motor and a function of forming the airflow path. In other words, the controller is provided as a member having plural functions so that the parts count of the dust collector is reduced.

According to a further aspect of the dust collector of the present invention, the dust collector motor is configured as a DC motor. The controller serves as a transformer which transforms power supplied from an external power source and supplies the power to the dust collector motor.

Generally, an output torque of the motor required to generate an air flow for collecting dust is smaller than that of the motor required to drive the driving mechanism and the tool accessory of the power tool. Therefore, a compact motor which can be driven at low voltage is used as the dust collector motor. According to this aspect, with the structure in which the controller serves as a transformer, the dust collector having the compact motor is rationally driven by power supplied from the external power source.

According to a further aspect of the dust collector of the present invention, the power tool to which the dust collector is attached is driven by power supplied from an external power source. Typically, the power tool has an AC motor, and the driving mechanism is driven by the AC motor to drive the tool accessory. The dust collector is driven by power supplied from the power tool. The dust collector motor of the dust collector is configured as a DC motor, and the controller serves as a convertor for converting an AC current supplied from the external power source into a DC current. Typically, the power tool is configured to drive the tool accessory by the AC motor which is driven by the AC current supplied from the external power source. Therefore, the AC current supplied from the power tool to the dust collector is converted into a DC current by the controller before being supplied to the dust collector motor.

According to this aspect, the controller converts the AC current supplied via the power tool into a DC current. Therefore, even when the power tool is driven by an AC current, the dust collector attached to the power tool can drive the dust collector motor configured as a DC motor.

According to a further aspect of the dust collector of the present invention, the controller is electrically connected to the power tool. The controller receives a signal outputted from the power tool and controls the dust collector motor based on the signal. Typically, the power tool has an operation member that is switched by user's operation between an on-state in which the power tool is driven and an off-state in which the driving of the power tool is stopped. When the operation member is switched to the on-state to drive the power tool, the power tool outputs a drive signal to the dust collector. Further, when the operation member is switched to the off-state to stop the driving of the power tool, the power tool outputs a stop signal to the dust collector. Upon receiving the drive signal outputted from the power tool, the controller of the dust collector drives the dust collector motor. Further, the controller stops the driving of the dust collector motor when a prescribed time elapses after receiving the stop signal. In this case, the manner of outputting the drive signal and the stop signal suitably includes a manner of supplying and interrupting a current in a prescribed electric system of the dust collector by switching of the switch which is operated by the operation member, and a manner in which a power tool controller provided as a signal output device generates a prescribed signal based on switching of the operation member.

According to this aspect, with the structure in which the controller drives the dust collector motor based on the signal outputted from the power tool, it is not necessary to separately provide a switch for switching the driving of the dust collector (the dust collector motor), so that the parts count of the dust collector is reduced. Further, with the structure in which the dust collector is driven when the operation member is operated to drive the power tool, the dust collector is rationally driven without user's special operation with respect to the dust collector at a driving timing when the power tool performs an operation. Furthermore, based on operation of the operation member to stop the driving of the power tool, the driving of the dust collector is stopped when a prescribed time elapses from this operation of the operation member. Therefore, the dust collector continues driving for a prescribed time even after the power tool stops performing the operation. As a result, dust which is not collected during the operation of the power tool is effectively collected by the driving of the dust collector after completion of the operation. Further, the dust collector automatically stops after a lapse of prescribed time, so that driving of the dust collector is rationally timed to stopping of the operation.

Effect of the Invention

According to the present invention, an improved technique is provided to improve operability in an operation using a power tool with a dust collector attached thereto.

Other objects, features and advantages of this invention will be readily understood after reading the following detailed description together with the accompanying drawings and the claims.

BEST MODES FOR PERFORMING THE INVENTION

Each of the additional features and method steps disclosed above and below may be utilized separately or in conjunction with other features and method steps to provide improved power tools and dust collectors, and devices utilized therein. Representative examples of this invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
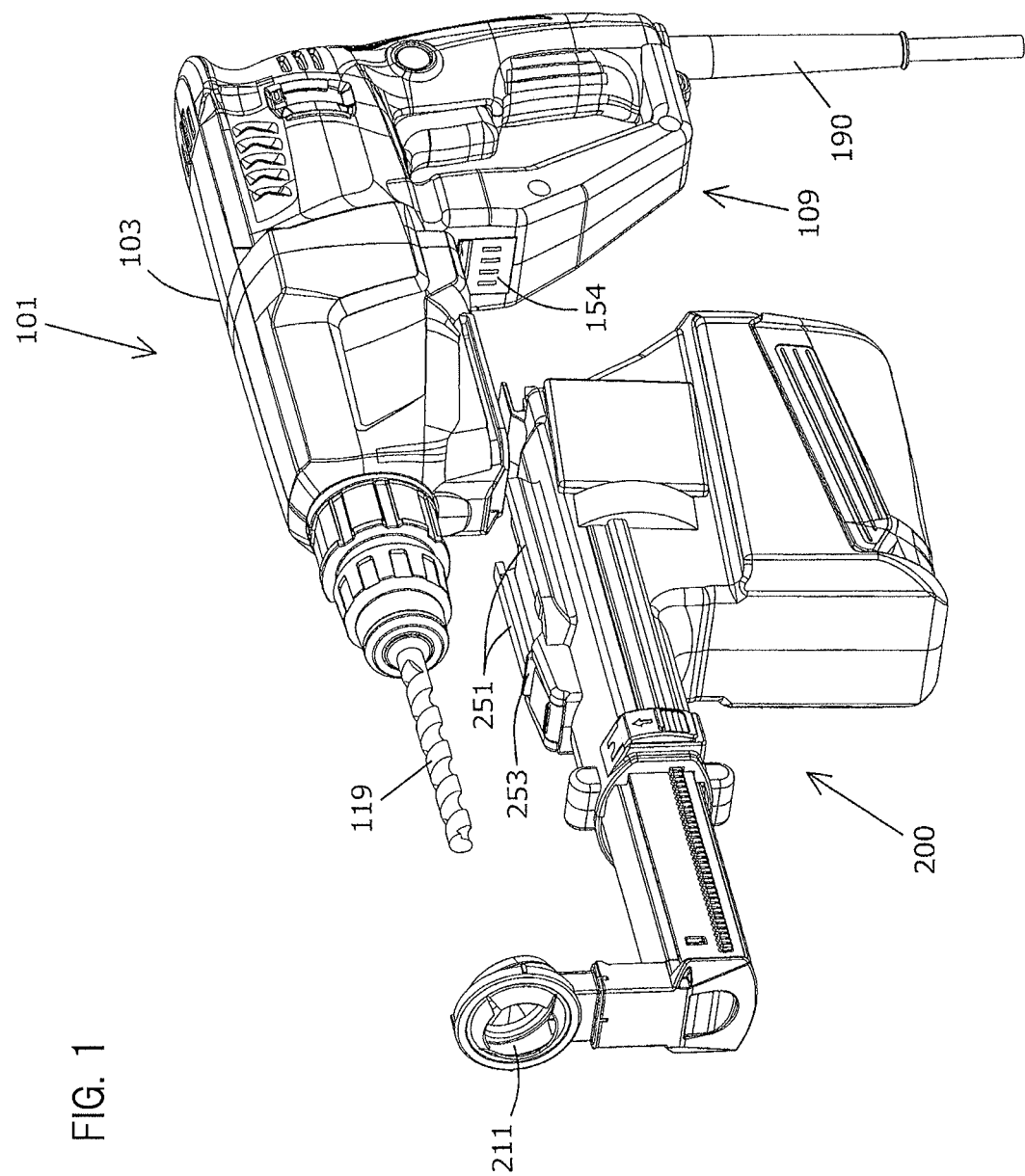
FIG. 1 is a perspective view showing a hammer drill and a dust collector according to a representative embodiment of the present invention.
Figure 2:
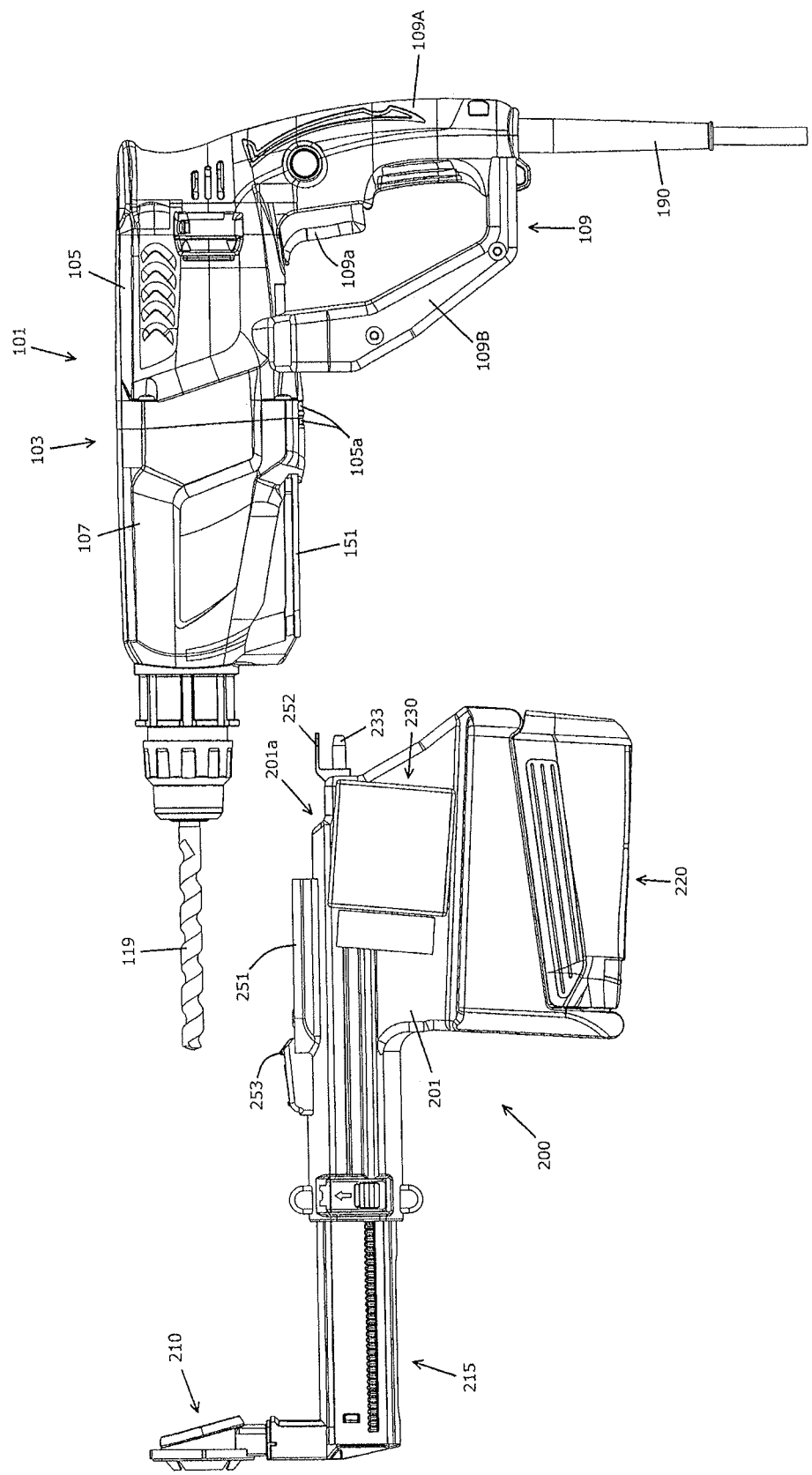
FIG. 2 is a side view of the hammer drill and the dust collector in FIG. 1.

A representative embodiment of the present invention is now explained with reference to FIGS. 1 to 7. In this embodiment, an electric hammer drill is explained as an example of a power tool to which a dust collector is detachably mounted. As shown in FIGS. 1 and 2, a hammer drill 101 mainly includes a body 103 and a handle 109. The body 103 mainly includes a motor housing 105 and a gear housing 107 which house respective internal mechanisms of the hammer drill 101. The body 103 and the handle 109 are example embodiments that correspond to the "tool body" and the "handle", respectively, according to the present invention.

As shown in FIG. 2, a hammer bit 119 that performs an operation on a workpiece is detachably mounted to the hammer drill 101 in a front end region of the body 103 (on the left side as viewed in FIG. 2). The handle 109 has a grip part 109A and a reinforcing part 109B and is provided in a rear end region of the body 103 on the side (the right side as viewed in FIG. 2) opposite to the front end region. Therefore, in the hammer drill 101, the hammer bit 119 side and the handle 109 side are referred to as a front side and a rear side, respectively.

[Driving Mechanism]

Figure 3:
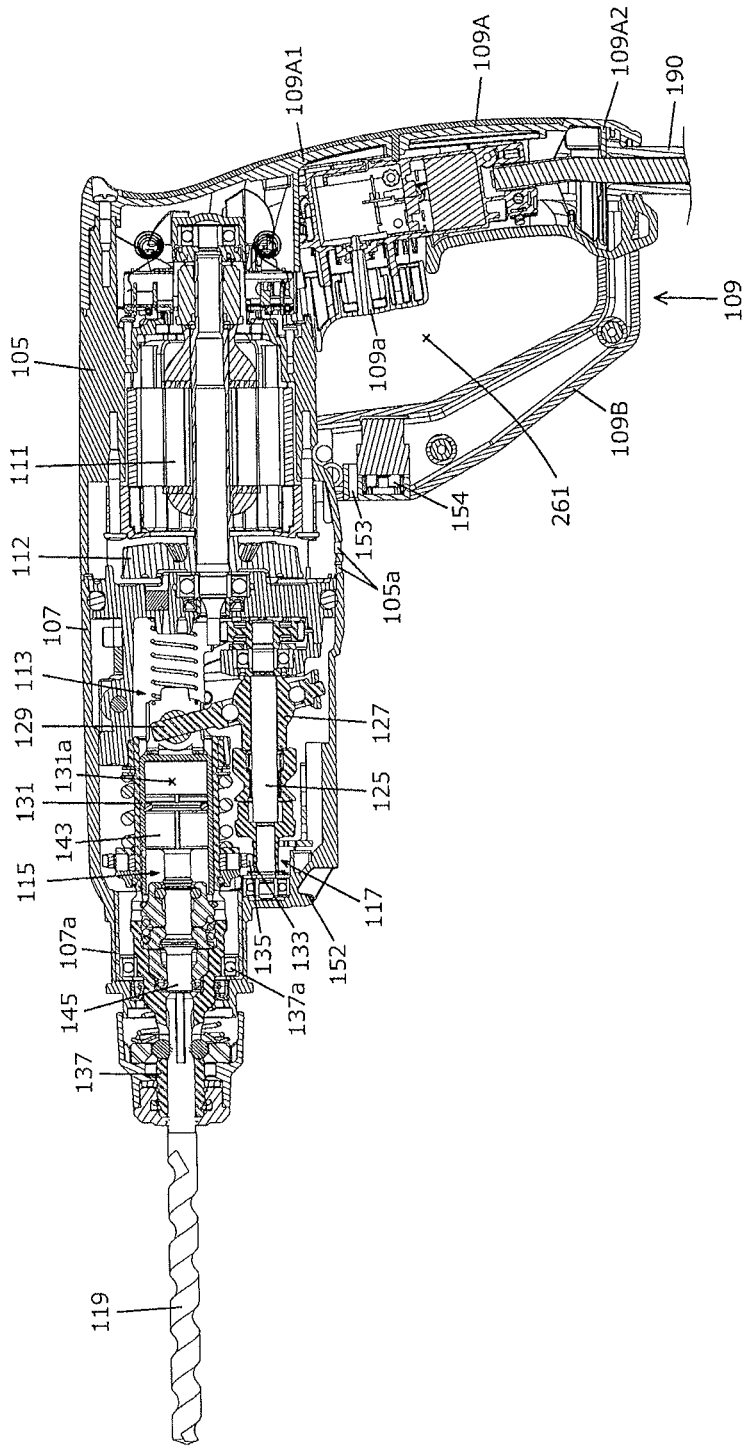
FIG. 3 is a sectional view showing an internal mechanism of the hammer drill.

As shown in FIG. 3, the motor housing 105 is integrally formed with the handle 109 and houses a driving motor 111. The driving motor 111 is arranged such that its rotation axis extends in parallel to an axial direction of the hammer bit 119. A cooling fan 112 is fitted onto the rotation axis of the driving motor 111 in front of the driving motor 111. Specifically, the cooling fan 112 is arranged between a driving mechanism and the driving motor 111 in the axial direction of the hammer bit 119. Therefore, the cooling fan 112 rotates by driving of the driving motor 111 to generate cooling air. The cooling fan 112 is configured as a centrifugal fan. Therefore, the cooling air is circulated through the gear housing 107 and then discharged through an opening 105a which is formed at a position corresponding to the cooling fan 112 in a lower surface of the motor housing 105. A trigger 109a is provided on the handle 109, and the driving motor 111 is turned on and off by operating the trigger 109a. The driving motor 111 and the cooling fan 112 are example embodiments that correspond to the "driving mechanism motor" and the "cooling fan", respectively, according to the present invention. Further, the opening 105a is an example embodiment that corresponds to the "outlet" according to the present invention.

As shown in FIG. 3, the gear housing 107 houses a motion converting mechanism 113, a striking mechanism 115 and a power transmitting mechanism 117. The motion converting mechanism 113 disposed forward of the driving motor 111 converts the rotating output of the driving motor 111 into linear motion and transmits it to the striking mechanism 115. Then, an impact force is generated in the axial direction of the hammer bit 119 (a horizontal direction as viewed in FIG. 3). Further, the power transmitting mechanism 117 disposed forward of the driving motor 111 reduces the speed of the rotating output of the driving motor 111 and transmits the rotating output to the hammer bit 119. As a result, the hammer bit 119 is rotated in a circumferential direction. For the sake of convenience of explanation, the hammer bit 119 side and the handle 109 side are referred to as a front and a rear, respectively. The motion converting mechanism 113, the striking mechanism 115 and the power transmitting mechanism 117 are an example embodiment that corresponds to the "driving mechanism" according to the present invention.

The motion converting mechanism 113 mainly includes an intermediate shaft 125, a swinging ring 129 and a cylindrical piston 131. The intermediate shaft 125 is rotated by the driving motor 111. Rotation of the intermediate shaft 125 causes the swinging ring 129 to swing in the axial direction of the hammer bit 119 via a rotary body 127, which in turn causes the cylindrical piston 131 to linearly reciprocate in the axial direction of the hammer bit 119.

The power transmitting mechanism 117 mainly includes a gear speed reducing mechanism having a plurality of gears. The gear speed reducing mechanism has a small-diameter gear 133 that rotates together with the intermediate shaft 125, and a large-diameter gear 135 that engages with the small-diameter gear 133. The power transmitting mechanism 117 transmits rotation of the driving motor 111 to a tool holder 137. The tool holder 137 is rotatably supported with respect to the gear housing 107 by a bearing 137a. Therefore, the tool holder 137 is rotated and the hammer bit 119 held by the tool holder 137 is rotationally driven.

The striking mechanism 115 mainly includes a striker 143 and an impact bolt 145. The striker 143 is configured as a striking element which is slidably disposed within the cylindrical piston 131. The impact bolt 145 is configured as an intermediate element which is slidably disposed within the tool holder 137. The striker 143 is driven via an action of an air spring (pressure fluctuations) of an air chamber 131a which is caused by sliding movement of the cylindrical piston 131 and collides with the impact bolt 145. As a result, the hammer bit 119 is caused to generate an impact (striking) force.

In the hammer drill 101, when the driving motor 111 is energized, rotation of the driving motor 111 is converted into linear motion via the motion converting mechanism 113 and then transmitted to the hammer bit 119 via the striking mechanism 115, so that the hammer bit 119 is caused to perform hammering motion. Further, rotation of the motor 111 is transmitted to the hammer bit 119 via the power transmitting mechanism 117. As a result, the hammer bit 119 performs a hammer drill operation on a workpiece by hammering motion in the axial direction and rotating motion in the circumferential direction.

The hammer drill 101 has a mode changeover switch (not shown) for switching an operation mode. The operation mode is switched between a hammer drill mode and a drill mode by user's operation of the mode changeover switch. In the hammer drill mode, the hammer bit 119 performs hammering motion and rotating motion. In the drill mode, the motion converting mechanism 113 and the striking mechanism 115 are not driven and only the power transmitting mechanism 117 is driven, so that the hammer bit 119 performs rotating motion. As a result, the hammer bit 119 performs a drilling operation on a workpiece.

[Handle]

As shown in FIG. 3, the grip part 109A of the handle 109 is formed to extend in a direction crossing the axial direction of the hammer bit 119 from a base end 109A1 connected to a rear end region of the motor housing 105. A power cable 190 is mounted to a distal end 109A2 of the grip part 109A, and one end of the reinforcing part 109B is connected to the distal end 109A2. The other end of the reinforcing part 109B is connected to the motor housing 105 at a position forward of the grip part 109A. Therefore, the grip part 109A, the reinforcing part 109B and the motor housing 105 form a loop shape, and a protection space 261 is formed surrounded by the grip part 109A, the reinforcing part 109B and the motor housing 105. With such a structure, the reinforcing part 109B structurally reinforces the cantilever-type grip part 109A and protects a user's hand holding the grip part 109A. Specifically, the user's hand in the protection space 261 is protected. A female connector 154 is provided in the vicinity of a connection of the reinforcing part 109B with the motor housing 105 and is mechanically and electrically connected to a dust collector 200. The power cable 190 is electrically connected to the driving motor 111 and the female connector 154, and power is supplied through the power cable 190. The grip part 109A and the reinforcing part 109B are example embodiments that correspond to the "grip" and the "connection part", respectively, according to the present invention. Further, the protection space 261 is an example embodiment that corresponds to the "second space" according to the present invention.

[Dust Collector Mounting Part]

The above-described hammer drill 101 is configured such that the dust collector 200 is detachably mounted thereto. Specifically, as shown in FIGS. 1 to 3 and 7, a dust collector mounting part formed in the hammer drill 101 mainly includes a guide groove 151, a body-side engagement part 152, an engagement groove 153 and the female connector 154. The dust collector 200 is mounted to the body 103 and the handle 109 of the hammer drill 101. The guide groove 151 is formed by a pair of right and left grooves formed in a lower region of the gear housing 107. The guide groove 151 extends in parallel to the axial direction of the hammer bit 119. Further, as shown in FIG. 3, the body-side engagement part 152 is configured as a recess which is formed on the hammer bit 119 side with respect to the guide groove 151. The engagement groove 153 and the female connector 154 are formed in a front surface (a surface facing the hammer bit 119) of the reinforcing part 109B of the handle 109. The guide groove 151 is an example embodiment that corresponds to the "first connection part" according to the present invention. The engagement groove 153 and the female connector 154 are an example embodiment that corresponds to the "second connection part" according to the present invention.

[Dust Collector]

The dust collector 200 which is attached to the hammer drill 101 is now explained. The dust collector 200 is referred to as a dust collecting attachment and is configured as a portable dust collecting attachment that can be carried together with the hammer drill 101 when attached to the hammer drill 101. Therefore, the hammer drill 101 can be driven with the dust collector 200 attached thereto. Further, the hammer drill 101 can also be driven with the dust collector 200 detached therefrom. Specifically, the hammer drill 101 is selectively driven in either one of a drive mode having the dust collector 200 (also referred to as a dust collector attached mode) and a drive mode not having the dust collector 200 (also referred to as a dust collector detached mode).

Figure 4:
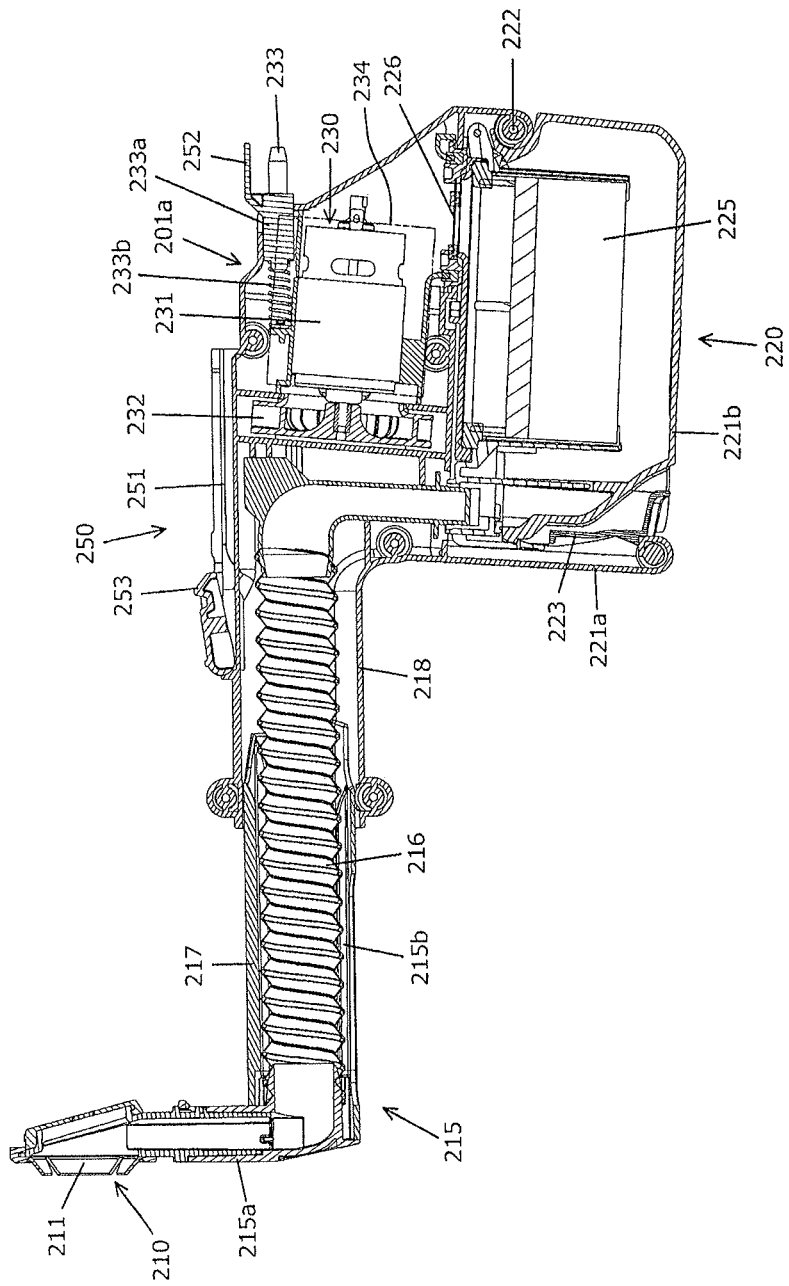
FIG. 4 is a sectional view showing the internal mechanism of the dust collector.

As shown in FIG. 4, the dust collector 200 mainly includes a body 201, a dust collecting part 210 and a mounting mechanism 250. The body 201 has a body housing 201A that forms an outer shell of the dust collector 200. The body housing 201A houses part of a dust transferring part 215 and houses a dust storing part 220 and a driving part 230. The body 201 is an example embodiment that corresponds to the "body" according to the present invention.

Figure 6:
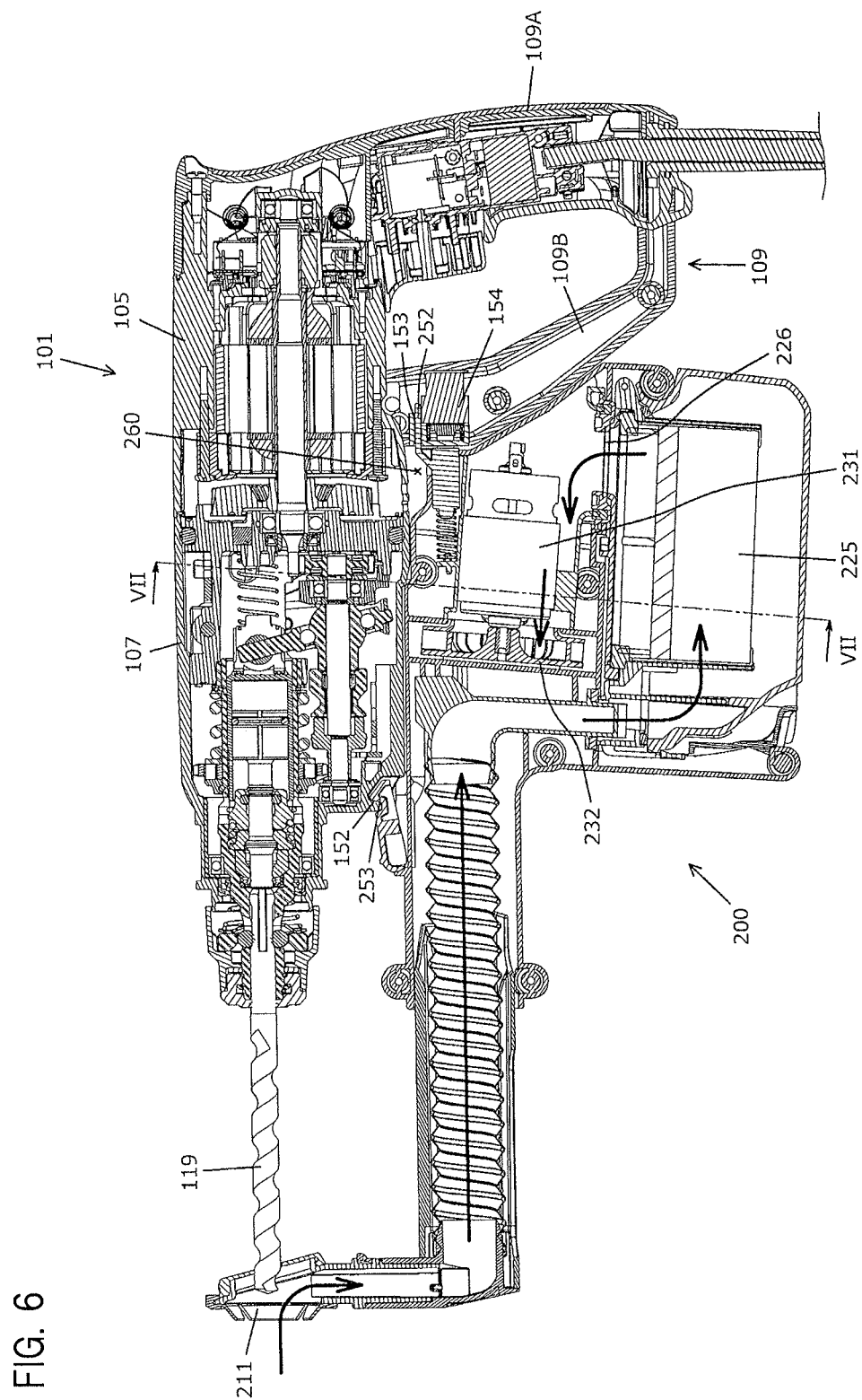
FIG. 6 is a sectional view of the hammer drill and the dust collector in FIG. 5.

The dust collecting part 210 has an opening 211 formed as a through hole through which the hammer bit 119 is inserted. As shown in FIG. 6, the opening 211 is arranged to surround the hammer bit 119 when the dust collector 200 is attached to the hammer drill 101. The dust collecting part 210 and the opening 211 are example embodiments that correspond to the "dust collecting part" and the "opening", respectively, according to the present invention.

As shown in FIG. 4, the dust transferring part 215 includes a first transferring part 215a and a second transferring part 215b. The first transferring part 215a is a hollow resin member and connected to the dust collecting part 210. Therefore, the inside of the first transferring part 215a and the opening 211 communicate with each other. As shown in FIG. 6, the first transferring part 215a extends in a direction crossing the axial direction of the hammer bit 119 when the dust collector 200 is attached to the hammer drill 101.

As shown in FIG. 4, the second transferring part 215b extends in a direction crossing the extending direction of the first transferring part 215a. Specifically, the second transferring part 215b extends in parallel to the axial direction of the hammer bit 119. The second transferring part 215b mainly includes a transfer hose 216, a first extending part 217 and a second extending part 218. The first and second extending parts 217, 218 are hollow resin members. Further, the second extending part 218 is configured as part of the body housing 201A. The first extending part 217 is configured to telescopically slide in the second extending part 218 in an extending direction (a horizontal direction as viewed in FIG. 4) of the second extending part 218. Specifically, the first and second extending parts 217, 218 can move with respect to each other. A bellows-like transfer hose 216 is disposed within the first and second extending parts 217, 218. Therefore, the transfer hose 216 expands and contracts when the first extending part 217 slides with respect to the second extending part 218. The transfer hose 216 communicates at one end with the first transferring part 215a and communicates at the other end with the dust storing part 220. Specifically, a storing part 225 of the dust storing part 220 communicates with the opening 211 of the dust collecting part 210 via the first and second transferring parts 215a, 215b (the transfer hose 216). The dust transferring part 215 is an example embodiment that corresponds to the "dust transferring part" according to the present invention.

As shown in FIG. 4, the dust storing part 220 mainly includes a fixed part 221a and a movable part 221b. The fixed part 221a is formed as part of the body housing 201A. The movable part 221b can be rotated on a pivot 222 provided in the body housing 201A. The movable part 221b has a latch 223 and is fixed to the fixed part 221a by engagement of the latch 223 with the fixed part 221a. The storing part 225 is provided within the movable part 221b, and dust is transferred to the storing part 225 and temporarily stored in the storing part 225. By disengaging the latch 223 from the fixed part 221a and turning the movable part 221b, the storing part 225 can be accessed and dust stored in the storing part 225 can be discarded. A filter 226 is disposed over a through hole formed on the top of the storing part 225 (on the side facing the driving part 230). The storing part 225 and the filter 226 are example embodiments that correspond to the "dust storing part" and the "filter", respectively, according to the present invention.

As shown in FIG. 4, the driving part 230 is provided above the dust storing part 220 within the body housing 201A. The driving part 230 mainly includes a dust collector motor 231, a fan 232, a male plug 233 and a controller 234. The dust collector motor 231 is configured as a direct-current motor and arranged such that its rotation axis extends in substantially parallel to the second transferring part 215b of the dust transferring part 215. The fan 232 is fitted onto the rotation axis of the dust collector motor 231 in front of the dust collector motor 231. The driving part 230 communicates with the storing part 225 via the filter 226. The dust collector motor 231, the fan 232 and the controller 234 are example embodiments that correspond to the "dust collector motor", the "fan" and the "controller", respectively, according to the present invention. Further, the body housing 201A is an example embodiment that corresponds to the "driving mechanism housing part" according to the present invention.

Figure 7:
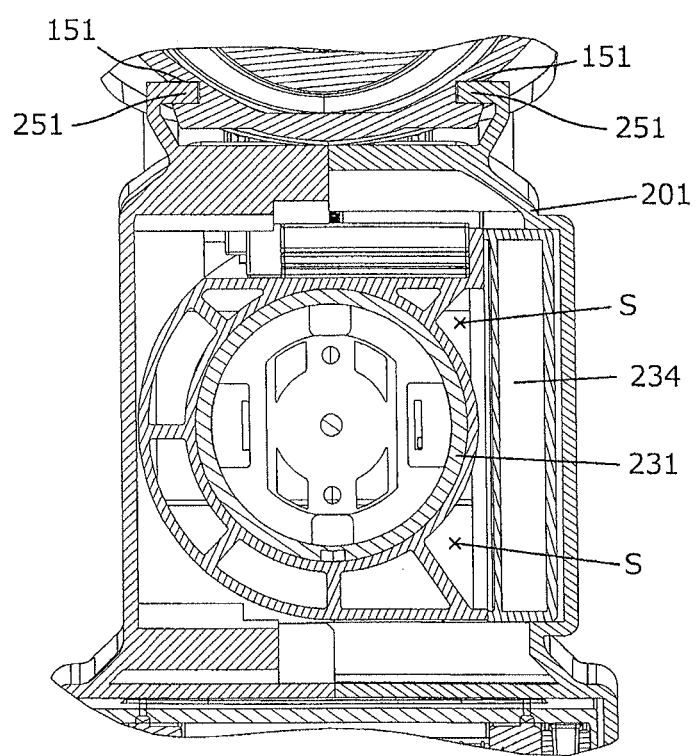
FIG. 7 is a sectional view taken along line VII-VII in FIG. 6.

The male plug 233 is disposed above the dust collector motor 231 on the side opposite to the dust storing part 220 and protrudes rearward from the body housing 201A. Four such male plugs 233 are provided and held by a plug holding part 233a. A front side of the plug holding part 233a on the side opposite to the male plug 233 is connected to the coil spring 233b. The coil spring 233b is further connected to the body housing 201A. With such a structure, the plug holding part 233a and the male plug 233 can be moved in a front-back direction (the axial direction of the hammer bit 119) via the coil spring 233b. The male plug 233 is electrically connected to the controller 234. As shown in FIG. 7, the controller 234 is disposed lateral to the dust collector motor 231 and controls driving of the dust collector motor 231. The dust collector motor 231 is held by a plurality of ribs formed on the body housing 201A, and a space surrounded by the ribs and the controller 234 is defined as an airflow path S. The airflow path S is an example embodiment that corresponds to the "airflow path" according to the present invention.

[Mounting Mechanism]

As shown in FIGS. 4 and 7, the dust collector 200 has a mounting mechanism 250 for attaching the dust collector 200 to the hammer drill 101. The mounting mechanism 250 mainly includes a guide rail 251 which is integrally formed with the body housing 201A on a top of the body housing 201A, an engagement projection 252 which is integrally formed with the plug holding part 233a, and a latch 253 formed on the body housing 201A.

As shown in FIG. 7, the guide rail 251 is formed by a pair of projections which are opposed to each other. As shown in FIG. 4, the engagement projection 252 is formed to protrude rearward from the dust collector 200 in parallel to the male plug 233. Further, the latch 253 can be rotated on a front end of the latch 253 with respect to the body housing 201A, and a rear end of the latch 253 is biased upward (upward as viewed in FIG. 4) in a direction away from the body housing 201A by a spring element (not shown). The guide rail 251 and the latch 253 are an example embodiment that corresponds to the "tool body connection part" according to the present invention. Further, the guide rail 251 is an example embodiment that corresponds to the "engagement part" according to the present invention.

[Attachment of the Dust Collector to the Hammer Drill]

Figure 5:
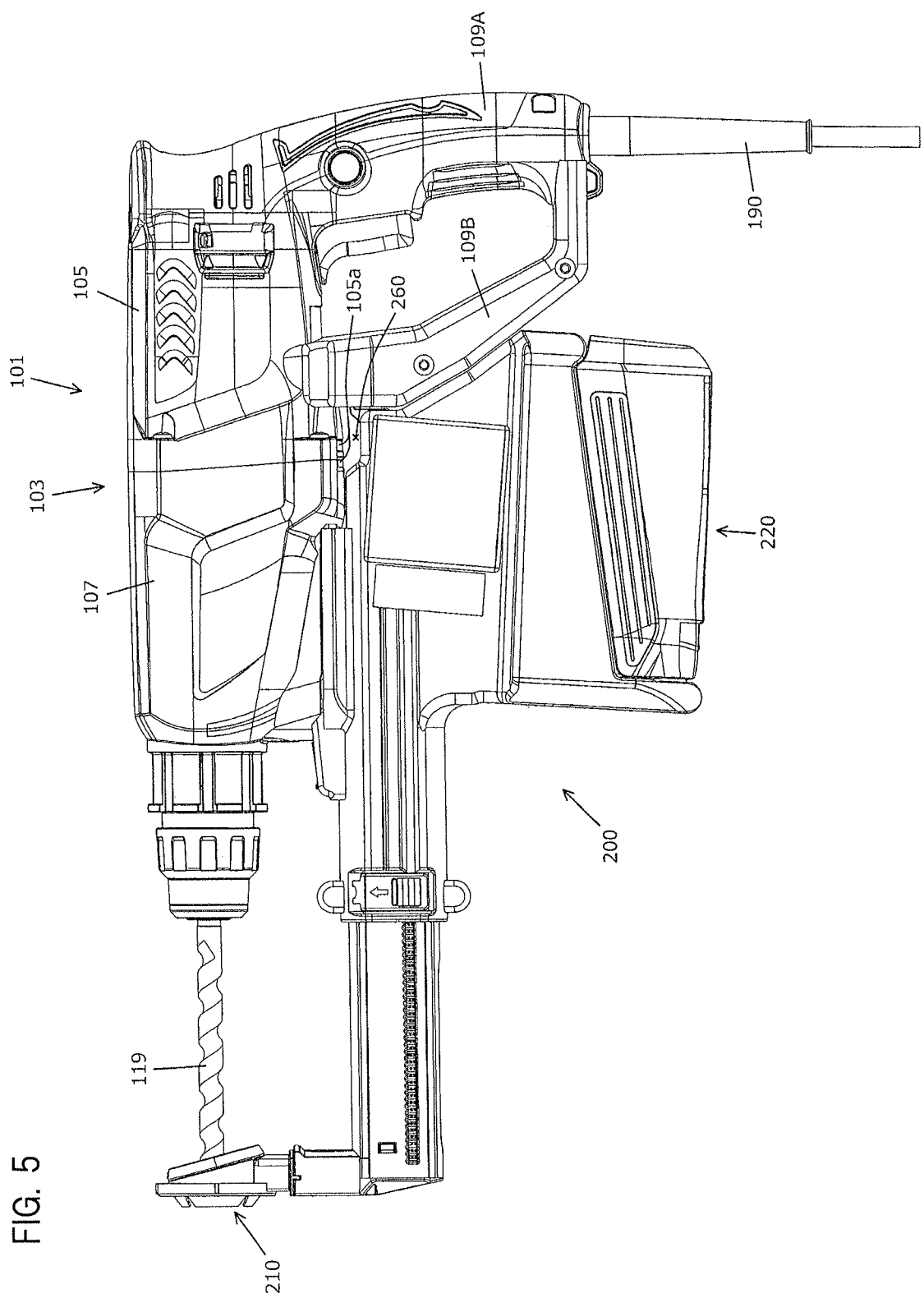
FIG. 5 is a side view showing the dust collector attached to the hammer drill.

Attachment of the dust collector 200 to the hammer drill 101 is now explained. The dust collector 200 is attached to the hammer drill 101 as shown in FIG. 5 by moving the dust collector 200 in the axial direction of the hammer bit 119 from a position shown in FIG. 2. Specifically, the guide groove 151 formed in the gear housing 107 of the hammer drill 101 and the guide rail 251 of the dust collector 200 are engaged with each other, and the dust collector 200 is slid from the hammer bit 119 side toward the handle 109 or rearward from the front of the hammer drill 101. Thereafter, as shown in FIG. 6, the latch 253 of the dust collector 200 is engaged with the body-side engagement part 152 of the hammer drill 101, and the engagement projection 252 of the dust collector 200 is engaged with the engagement groove 153 of the hammer drill 101. Specifically, the dust collector 200 is engaged with the gear housing 107 and the handle 109 of the hammer drill 101. Thus, the dust collector 200 is fixedly attached to the hammer drill 101. At the same time, the male plug 233 of the dust collector 200 is mechanically connected to the female connector 154 of the hammer drill 101, so that the dust collector 200 is electrically connected to the hammer drill 101. The engagement projection 252 and the male plug 233 are an example embodiment that corresponds to the "handle connection part" according to the present invention.

As described above, the dust collector 200 is attached to the hammer drill 101 by engaging with the gear housing 107 and the handle 109 of the hammer drill 101. As shown in FIG. 2, a stepped portion 201a is formed on the top of the body housing 201A of the dust collector 200. By providing the stepped portion 201a, as shown in FIG. 5, a heat radiation space 260 is formed between the motor housing 105 of the hammer drill 101 and the body housing 201A of the dust collector 200 when the dust collector 200 is attached to the hammer drill 101. The opening 105a of the motor housing 105 is formed at a position corresponding to the heat radiation space 260. Cooling air generated by the cooling fan 112 is discharged to the heat radiation space 260 through the opening 105a after cooling the driving motor 111 within the motor housing 105. Therefore, the dust collector 200 is attached to the hammer drill 101 without closing the cooling air outlet of the hammer drill 101. The stepped portion 201a is an example embodiment that corresponds to the "space forming part" according to the present invention.

[Structure of Electrically Connecting the Dust Collector and the Hammer Drill]

Figure 9:
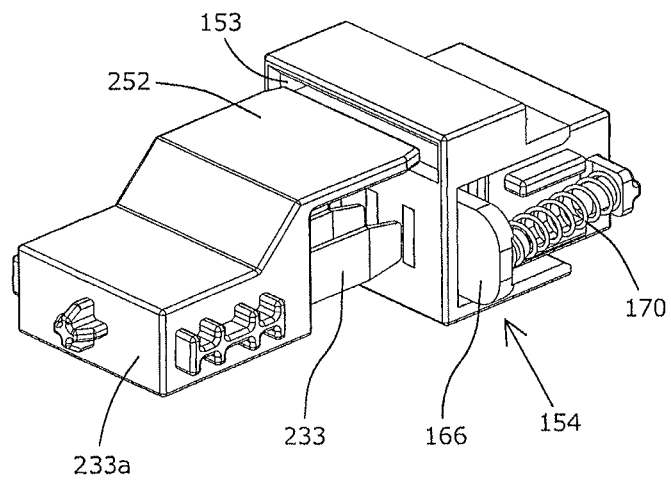
FIG. 9 is a sectional view showing a female connector and a male plug according to the present invention.
Figure 10:
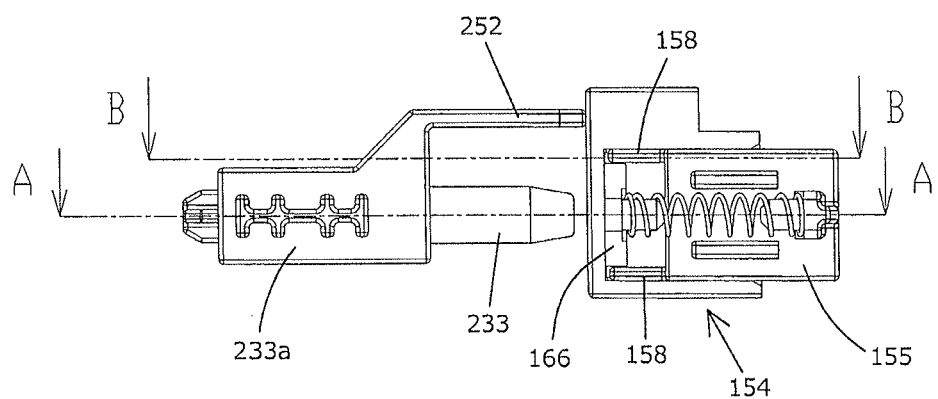
FIG. 10 is a side view of the female connector and the male plug.

Electrical connection of the dust collector 200 and the hammer drill 101 is now explained with reference to FIGS. 9 to 19. FIGS. 9 and 10 are a perspective view and a side view, respectively, showing the female connector 154 of the hammer drill 101 and the male plug 233 of the dust collector 200. When the male plug 233 is not inserted into the female connector 154, an opening of the female connector 154 into which the male plug 233 is inserted is closed in order to prevent entry of dust. The female connector 154 and the male plug 233 are example embodiments that correspond to the "female part" and the "male part", respectively, according to the present invention.

Figure 11:
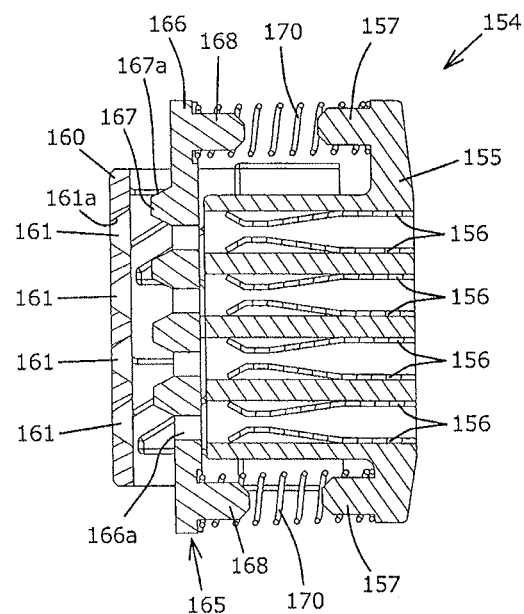
FIG. 11 is a sectional view of the female connector taken along line A-A in FIG. 10 and showing a state in which a movable part is moved.
Figure 12:
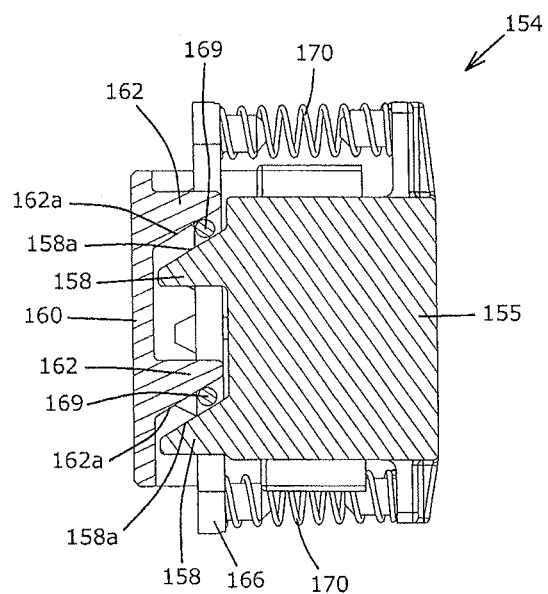
FIG. 12 is a sectional view of the female connector taken along line B-B in FIG. 10 and showing the state in which the movable part is moved.

Specifically, as shown in FIGS. 11 and 12, the female connector 154 mainly includes a connector body 155, a plug insertion part 160, a movable part 165 and coil springs 170. Further, for the sake of explanation, FIGS. 11 and 12 shows only the female connector 154 in a sectional view taken along line A-A in FIG. 10. An upper side, a lower side, a left side and a right side in FIG. 10 are defined as an upper side, a lower side, a front side and a rear side of the female connector 154, respectively.

The connector body 155 and the plug insertion part 160 are integrally connected together and fixed to the reinforcing part 109B of the handle 109. Specifically, the female connector 154 is fixed to the reinforcing part 109B such that a front surface of the plug insertion part 160 is substantially flush with an outer surface of the reinforcing part 109B. The movable part 165 is held between the plug insertion part 160 and the connector body 155 and arranged to be movable in the front-back direction with respect to the plug insertion part 160 and the connector body 155. The movable part 165 is normally biased forward by the coil springs 170. With such a structure, the movable part 165 closes openings 161 formed in the plug insertion part 160. As a result, the inside of the female connector 154 is shielded from the outside.

As shown in FIGS. 11 and 12, the connector body 155 is a substantially rectangular parallelepiped member and provided with metal terminals 156, first holding parts 157 and first inclined parts 158. As shown in FIG. 11, the metal terminals 156 are formed by plural pairs of metal plates and provided to come in contact with both sides of the plate-like male plugs 233. With such a structure, the metal terminals 156 hold the male plugs 233 therebetween by utilizing elasticity of the metal plates, so that the metal terminals 156 and the male plugs 233 are mechanically and electrically connected to each other. In this embodiment, four pairs of the metal terminals 156 are provided corresponding to the four male plugs 233.

The first holding parts 157 are provided to hold one end of the coil springs 170 and protrude from the connector body 155 toward the movable part 165. Specifically, the first holding parts 157 protrude forward from a rear end of the connector body 155. Two such holding parts 157 are provided corresponding to the two coil springs 170.

As shown in FIG. 12, each of the first inclined parts 158 protrudes from the connector body 155 toward the plug insertion part 160 and has a first guide surface 158a which is inclined with respect to the protruding direction of the first inclined part (the front-back direction of the female connector 154, an inserting direction of the male plug 233). As shown in FIG. 12, two such first inclined part 158 are provided on the upper side of the connector body 155. The two first inclined parts 158 are spaced apart from each other in a direction parallel to an outer surface (front surface) of the plug insertion part 160. Further, like the first inclined parts 158 on the upper side of the connector body 155, as shown in FIG. 10, two such first inclined parts 158 are also provided on the lower side of the connector body 155.

As shown in FIG. 11, the plug insertion part 160 has four openings 161 into which the four male plugs 233 are inserted. Each of the openings 161 extends in a vertical direction of the female connector 154 and has an inclined surface 161a which is inclined with respect to a depth direction of the opening 161 (the front-back direction of the female connector 154, the inserting direction of the male plug 233) such that its opening width on the inner side facing the connector body 155 is wider than that on the opposite outer side. The plug insertion part 160 and the opening 161 are example embodiments that correspond to the "opening part" and the "opening", respectively, according to the present invention.

As shown in FIG. 12, the plug insertion part 160 has second inclined parts 162 protruding toward the connector body 155. Two such second inclined parts 162 are provided on the upper side of the plug insertion part 160 and configured to face the two first inclined parts 158 on the upper side of the connector body 155. Each of the second inclined parts 162 has a second guide surface 162a which is inclined with respect to the protruding direction of the second inclined part (the front-back direction of the female connector 154, the inserting direction of the male plug 233). The second guide surface 162a is formed in parallel to the first guide surface 158a of the connector body 155. Therefore, a guide space is formed between the first and second guide surfaces 158a, 162a and extends in an oblique direction with respect to the inserting direction of the male plug 233. Further, like the second inclined parts 162 on the upper side of the plug insertion part 160, two such second inclined parts are also provided on the lower side of the plug insertion part 160. With such a structure, the guide space is formed on the upper and lower sides of the female connector 154.

As shown in FIGS. 11 and 12, the movable part 165 mainly includes a body 166 that can be moved between the connector body 155 and the plug insertion part 160 in the front-back direction of the female connector 154. As shown in FIGS. 9 and 10, the body 166 is a substantially plate-like member and disposed between the upper and lower first inclined parts 158 (the second inclined parts 162).

As shown in FIG. 11, the body 166 has four plug insertion holes 166a into which the four male plugs 233 are inserted. The body 166 further has opening sealing parts 167 and second holding parts 168. Each of the opening sealing part 167 is formed on a front surface of the body 166 facing the opening 161 of the plug insertion part 160 and protrudes from the body 166 toward the plug insertion part 160. The opening sealing part 167 is formed adjacent to the plug insertion hole 166a. An inclined surface 167a is formed in a front end region of the opening sealing part 167 and inclined with respect to the protruding direction of the opening sealing part 167 (the front-back direction of the female connector 154). The inclined surface 167a is provided to face the inclined surface 161a formed in the opening 161 of the plug insertion part 160. Specifically, the inclined surfaces 161a, 167a are formed substantially in parallel to each other.

The second holding parts 168 are provided to hold the other end of the coil springs 170, and protrude from the movable part 165 toward the connector body 155. Specifically, the second holding parts 168 are formed on a rear surface of the body 166 on the side opposite to the front surface on which the opening sealing part 167 is formed. Two such second holding parts 168 are provided corresponding to the two coil springs 170.

As shown in FIG. 12, guide pins 169 are connected to the body 166. Each of the guide pins 169 is arranged in the guide space formed between the upper first and second inclined parts 158, 162 of the female connector 154. Specifically, the guide pin 169 protrudes upward from the body 166. Further, such a guide pin is also connected to the body 166 so as to protrude downward from the body 166 and arranged in the guide space formed between the lower first and second inclined parts 158, 162 of the female connector 154.

As shown in FIGS. 11 and 12, each of the coil springs 170 is held by the first and second holding parts 157, 168 and normally biases the movable part 165 forward.

Figure 13:
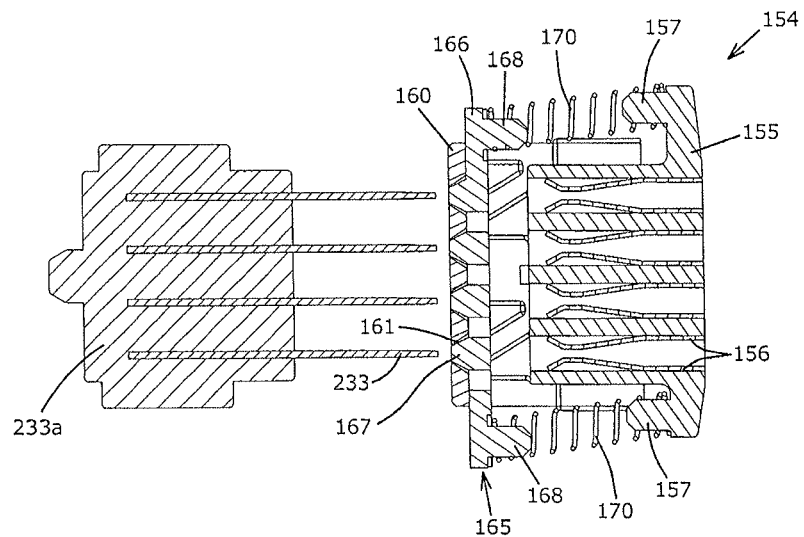
FIG. 13 is a sectional view of the female connector and the male plug taken along line A-A in FIG. 10.
Figure 14:
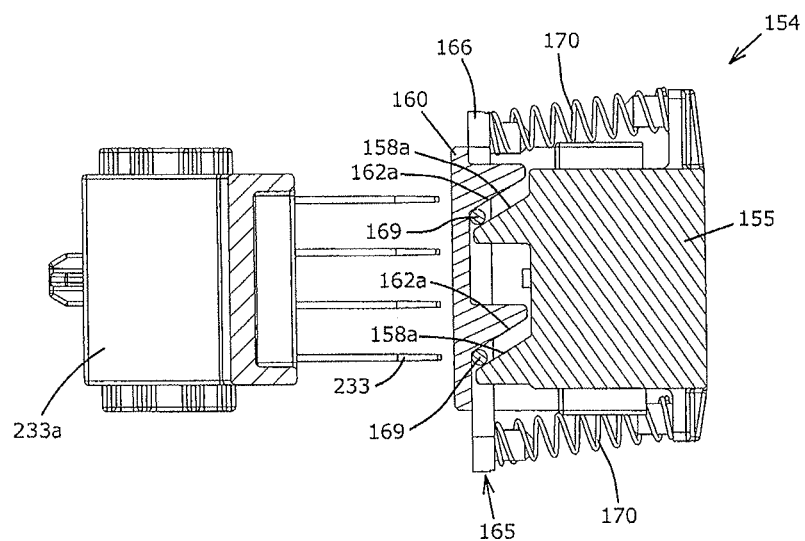
FIG. 14 is a sectional view of the female connector and the male plug taken along line B-B in FIG. 10.

Movement of the female connector 154 in connecting the male plug 233 to the female connector 154 is now explained with reference to FIGS. 13 to 19. As shown in FIGS. 13 and 14, when the male plug 233 is not yet inserted into the female connector 154, the opening sealing part 167 is held in the opening 161 by the biasing force of the coil springs 170, so that the opening 161 is sealed. At this time, the opening sealing part 167 is held in contact with an opening edge of the opening 161 in an outer surface of the plug insertion part 160, so that a front end of the opening sealing part 167 is arranged flush with the outer surface of the plug insertion part 160. In this manner, the opening 161 is sealed and communication of the metal terminals 156 with the outside is blocked. A forward position of the opening sealing part 167 for sealing the opening 161 is an example embodiment that corresponds to the "sealing position" according to the present invention.

Figure 15:
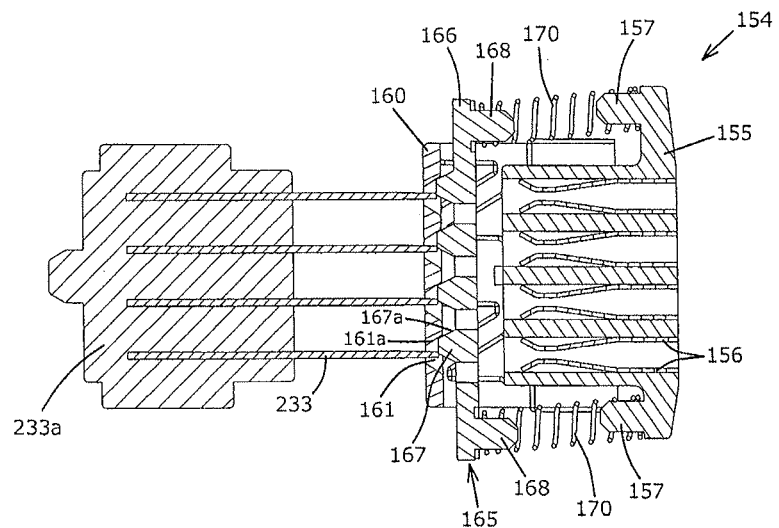
FIG. 15 is a sectional view corresponding to FIG. 13 and showing a process of connecting the male plug to the female connector.

In order to connect the male plug 233 to the female connector 154, the male plug 233 provided in the dust collector 200 is moved from a position shown in FIG. 13 to a position shown in FIG. 15 or rearward from the front of the female connector 154. The front end of the male plug 233 comes in contact with the opening sealing part 167 and moves the movable part 165 rearward against the biasing force of the coil springs 170. At this time, the two guide pins 169 (also referred to as guide members) which are provided on each of the upper and lower sides of the body 166 of the movable part 165 move along the first and second guide surfaces 158a, 162a within the guide space. Specifically, the movable part 165 is moved while the guide pin 169 is guided by the first and second guide surfaces 158a, 162a. Thus, the movable part 165 is moved obliquely rearward with respect to the plug insertion part 160 and away from the plug insertion part 160. As a result, the opening 161 is no longer sealed by the opening sealing part 167, so that the male plug 233 is allowed to be inserted into the female connector 154.

Figure 17:
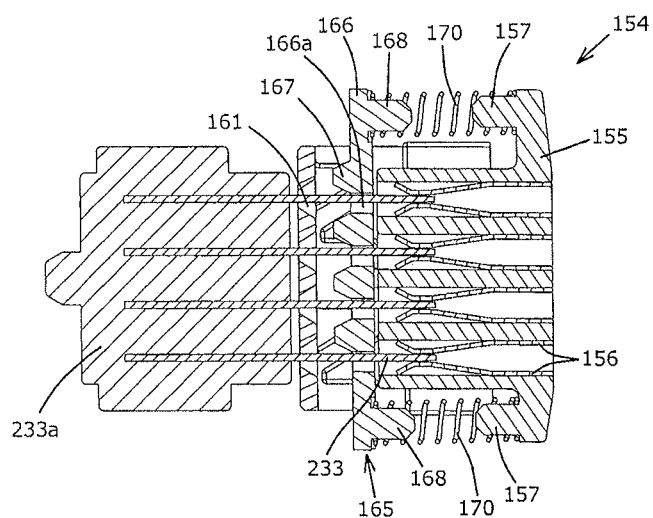
FIG. 17 is a sectional view corresponding to FIG. 13 and showing a state in which the male plug is connected to the female connector.
Figure 19:
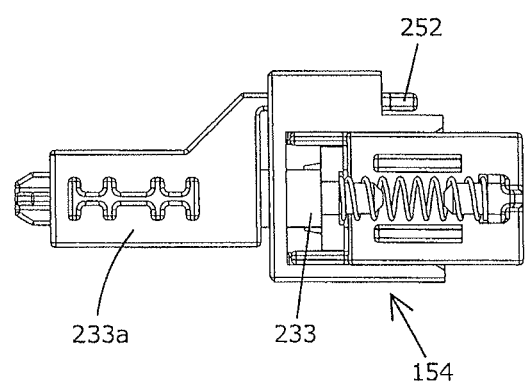
FIG. 19 is a side view corresponding to FIG. 10 and showing the state in which the male plug is connected to the female connector.

When the male plug 233 is further moved rearward into the female connector 154 from the position shown in FIG. 15 to a position shown in FIG. 17, the plug insertion hole 166a formed adjacent to the opening sealing part 167 is aligned with the opening 161 of the plug insertion part 160 in the front-back direction of the female connector 154. In other words, the movable part 165 is guided to move obliquely rearward, so that the plug insertion hole 166a of the movable part 165 is moved in a transverse direction crossing the front-back direction of the female connector 154. Thus, the plug insertion hole 166a is aligned with the opening 161. As a result, the male plug 233 is displaced from the opening sealing part 167 and inserted into the plug insertion hole 166a. Finally, the male plug 233 is placed between the metal plates of the metal terminals 156. In this manner, as shown in FIG. 19, connection between the male plug 233 and the female connector 154 is completed. The rearward position of the opening sealing part 167 which is aligned with a partition wall formed between the openings 161 of the plug insertion part 160 is an example embodiment that corresponds to the "open position" according to the present invention. Further, the front-back direction and the transverse direction of the female connector 154 are example embodiments that correspond to the "longitudinal direction" and the "crossing direction", respectively, according to the present invention.

Upon completion of connection between the male plug 233 and the female connector 154, the male plug 233 is mechanically and electrically connected to the metal terminal 156 and a current is supplied from the hammer drill 101 to the dust collector 200. Further, when the male plug 233 is connected to the female connector 154, the engagement projection 252 extending from the plug holding part 233a is inserted into the engagement groove 153 formed adjacent to the plug insertion part 160 in the female connector 154, so that the engagement projection 252 and the engagement groove 153 are mechanically connected to each other. The metal terminal 156 and the male plug 233 are example embodiments that correspond to the "female terminal" and the "male terminal", respectively, according to the present invention.

In order to remove the male plug 233 from the female connector 154, the operation of connecting the male plug 233 to the female connector 154 is reversed. At this time, when the male plug 233 is disengaged from the metal terminal 156 and pulled out of the plug insertion hole 166a and the opening 161, the opening sealing part 167 of the movable part 165 seals the opening 161 since the movable part 165 is biased forward by the coil springs 170.

Figure 16:
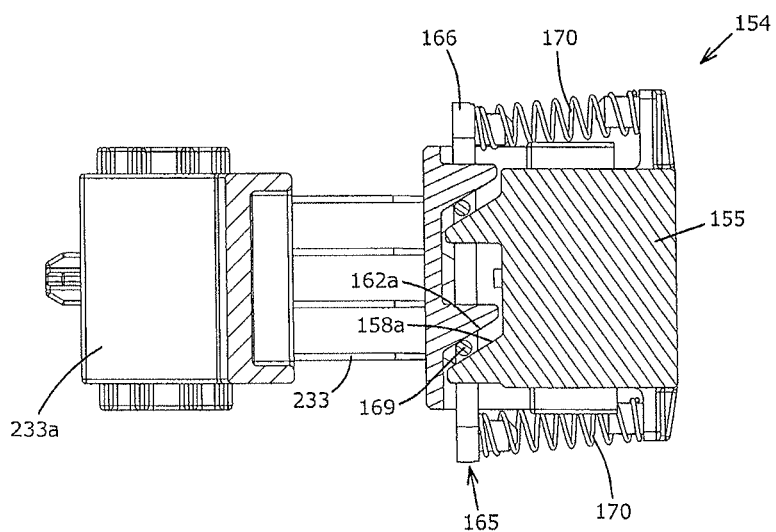
FIG. 16 is a sectional view corresponding to FIG. 14 and showing the process of connecting the male plug to the female connector.
Figure 18:
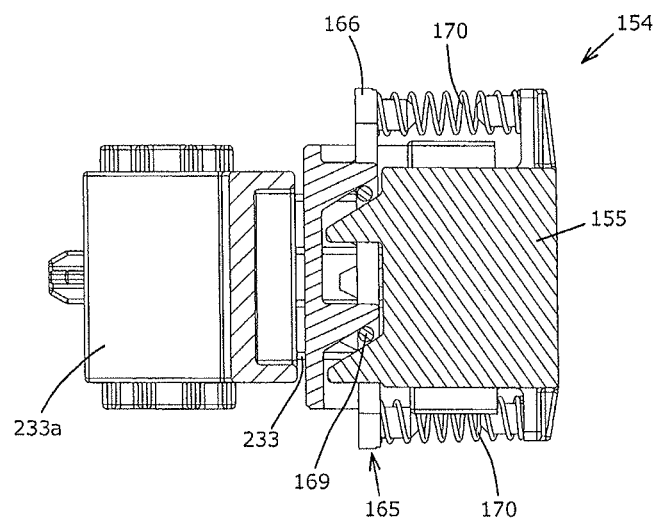
FIG. 18 is a sectional view corresponding to FIG. 14 and showing the state in which the male plug is connected to the female connector.

Specifically, as shown in FIGS. 18 and 16, the guide pin 169 of the movable part 165 is guided by the first and second guide surfaces 158a, 162a and the movable part 165 is moved obliquely forward toward the plug insertion part 160 as the male plug 233 is pulled out. Finally, as shown in FIG. 13, the male plug 233 is pulled out of the female connector 154. At this time, as shown in FIGS. 15 and 13, the opening sealing part 167 of the movable part 165 is smoothly disposed within the opening 161 via the inclined surfaces 161a, 167a which are inclined with respect to the front-back direction of the female connector 154. As a result, the opening 161 is sealed by the opening sealing part 167.

When the dust collector 200 is attached to the hammer drill 101, power can be supplied from the power cable 190 of the hammer drill 101 to the controller 234 of the dust collector 200 via the electrically connected male plug 233 and female connector 154. In other words, the dust collector 200 attached to the handle 109 of the hammer drill 101 is supplied with power via the handle 109. Therefore, the handle 109 serves not only as a component to be held by a user, but also as a component for supplying power to the dust collector 200 when the dust collector 200 is attached thereto.

[Operation of the Hammer Drill and the Dust Collector]

When a user operates the trigger 109a in order to perform a prescribed operation using the hammer drill 101, the driving motor 111 of the hammer drill 101 is driven by an AC current supplied from an external power source via the power cable 190. Then, the motion converting mechanism 113, the striking mechanism 115 and the power transmitting mechanism 117 which form the driving mechanism are driven by the driving motor 111 and drive the hammer bit 119. A prescribed operation (hammer drill operation or drilling operation) is performed by pressing the hammer bit 119 against a workpiece. In this operation, the dust collecting part 210 surrounding the hammer bit 119 also comes in contact with the workpiece together with the hammer bit 119. Then the hammer bit 119 advances into the workpiece, but the dust collecting part 210 is held in contact with a surface of the workpiece. Specifically, as the operation proceeds, the bellows-like transfer hose 216 contracts and the first extending part 217 telescopically slides in the second extending part 218, so that the dust collecting part 210 moves with respect to the hammer bit 119.

In the hammer drill 101, when the trigger 109a is operated to drive the driving motor 111, a drive signal is outputted to the dust collector 200 at the same time. For example, a trigger switch (not shown) is turned on by operating the trigger 109a, and a minute current is supplied as the drive signal to the dust collector 200. The drive signal is outputted from the hammer drill 101 to the dust collector 200 through a wiring of a different system from a wiring for supplying dust collector driving power to the dust collector 200. Further, the both wirings are electrically connected by the female connector 154 of the hammer drill 101 and the male plug 233 of the dust collector 200. The controller 234 drives the dust collector motor 231 based on the drive signal. Specifically, upon receiving the drive signal, the controller 234 drives the dust collector motor 231, and the hammer drill 101 and the dust collector 200 are driven substantially at the same time. The drive mode in which the hammer drill 101 and the dust collector 200 are simultaneously driven with the dust collector 200 attached to the hammer drill 101 is an example embodiment that corresponds to the "first drive mode" according to the present invention. The hammer drill 101 can also be driven without the dust collector 200 attached thereto. The drive mode in which the hammer drill 101 is driven without the dust collector 200 attached thereto is an example embodiment that corresponds to the "second drive mode" according to the present invention. Further, the drive signal and the trigger 109a are example embodiments that correspond to the "drive signal" and the "operation member", respectively, according to the present invention.

In driving the dust collector 200, the controller 234 supplies power supplied via the handle 109 of the hammer drill 101 to the dust collector motor 231 after lowering the voltage and converting the AC current into a DC current. Specifically, the controller 234 serves as a transformer and a convertor. The controller 234 supplies power to the dust collector motor 231 and controls the driving of the dust collector motor 231. Thus, the controller 234 controls rotation of the fan 232.

When the fan 232 is rotated, as shown in FIG. 6, air is sucked in through the opening 211 of the dust collecting part 210. As shown by arrows in FIG. 6, the sucked air is led to the fan 232 through the transfer hose 216, the storing part 225, the filter 226 and the dust collector motor 231, and then discharged through an outlet (not shown) formed in the body housing 201 of the dust collector 200. By this air flow, dust which is generated by machining the workpiece with the hammer bit 119 is sucked in through the opening 211 of the dust collecting part 210 and led to the storing part 225. When the sucked air passes through the filter 226, dust is captured by the filter 226 and accumulated in the storing part 225.

After passing through the filter 226, the air is led to the fan 232 through the airflow path S (see FIG. 7) between the controller 234 and the dust collector motor 231. As shown in FIG. 7, the airflow path S is defined by a wall (for example, a heat radiating plate) which forms an outer surface of the controller 234, and the ribs provided for holding the dust collector motor 231 inside the body housing 201. Therefore, the controller 234 and the dust collector motor 231 are cooled by the air flow through the airflow path S.

When the operation of the trigger 109a is released to stop the driving of the driving motor 111, a stop signal is outputted to the dust collector 200 at the same time. For example, the trigger switch (not shown) is turned off by operating the trigger 109a, and supply of the minute current as the drive signal to the dust collector 200 is interrupted. This interruption or stop of the drive signal is utilized as a stop signal. The controller 234 stops the dust collector motor 231 based on the stop signal. Specifically, the controller 234 stops the dust collector motor 231 when a prescribed time (for example, three seconds) elapses from reception of the stop signal. Therefore, the dust collector 200 continues driving even after the hammer drill 101 stops driving. The stop signal is an example embodiment that corresponds to the "stop signal" according to the present invention.

Figure 8:
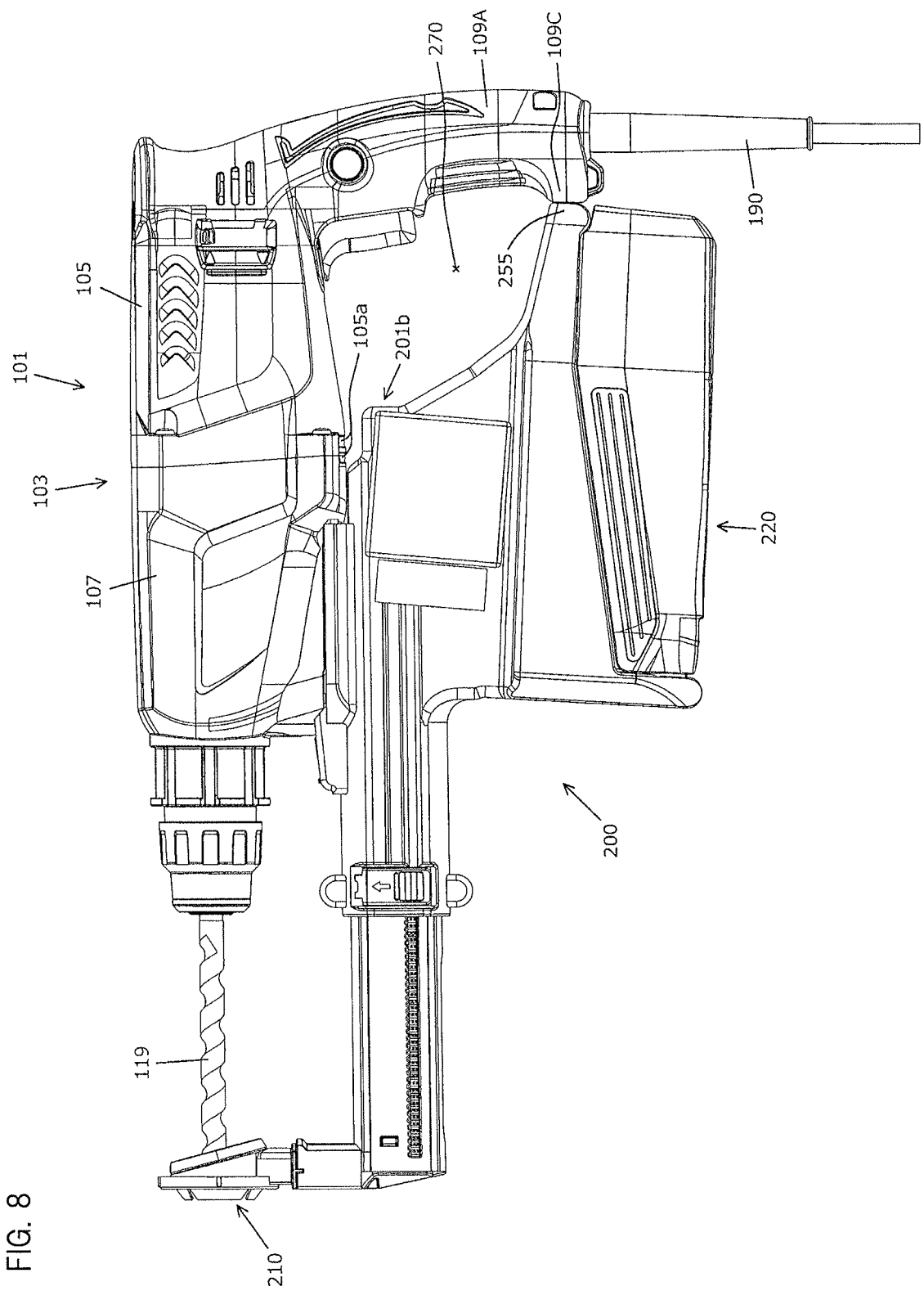
FIG. 8 is a side view of the hammer drill and the dust collector according to a modification.

In the above-described embodiment, the handle 109 has the grip part 109A and the reinforcing part 109B, but it may be configured otherwise. For example, as shown in FIG. 8, the handle 109 may have just the grip part 109A. In this case, the dust collector 200 has a handle connection part 255 formed on its rear end on the side opposite to the dust collecting part 210. A male terminal (not shown) is provided in the handle connection part 255, and a female terminal (not shown) is provided in a mounting part 109C formed on a distal end part of the grip part 109A. When the terminals are engaged and electrically connected with each other, a heat radiation space 270 is defined by the dust collector 200, the motor housing 105 (the body 103) and the handle 109. Specifically, the dust collector 200 has stepped portions 201a, 201b so that the heat radiation space 270 is formed when the dust collector 200 is attached to the hammer drill 101. The heat radiation space 270 serves not only as a space for discharging the cooling air through the opening 105a, but also as a space for placing user's fingers holding the grip part 109A. Therefore, the dust collector 200 attached to the hammer drill 101 protects the user's fingers holding the grip part 109A during operation of the hammer drill 101.

According to the above-described embodiment, the dust collector 200 is attached to the handle 109. Therefore, the handle 109 is utilized not only as a grip part to be held by a user but also as a dust collector mounting part to which the dust collector 200 is attached.

According to the above-described embodiment, the dust collector 200 is attached to the body 103 and the handle 109 of the hammer drill 101. Specifically, the dust collector 200 is supported at plural points of the hammer drill 101. Therefore, the dust collector 200 is stably attached to the hammer drill 101.

According to the above-described embodiment, the dust collector 200 is attached to the handle 109 and supplied with power via the handle 109. Therefore, the wiring for supplying power to the dust collector 200 is arranged inside the handle 109 of the hammer drill 101. Generally, in the power tool, mechanical system parts such as the driving mechanism for driving the tool accessory are not disposed inside the handle 109. Therefore, mechanical elements such as the driving mechanism and electrical elements such as the wiring are rationally arranged apart from each other.

According to the above-described embodiment, the dust collector 200 is attached to the hammer drill 101 such that the heat radiation space 260, 270 is formed between the hammer drill 101 and the dust collector 200. In other words, the dust collector 200 is provided with the stepped portions 201a, 201b such that the heat radiation space 260, 270 is formed when the dust collector 200 is attached to the hammer drill 101. Therefore, the dust collector 200 does not block the opening 105a which is configured as the outlet for discharging the cooling air from the hammer drill 101. As a result, the cooling air generated by the cooling fan 112 is reliably discharged to the outside of the body 103.

According to the above-described embodiment, the side wall of the controller 234 defines the airflow path S. Specifically, the controller 234 is arranged to be exposed to the airflow path S. With such a structure, the efficiency of cooling the controller 234 by the air flow generated by rotation of the fan 232 is enhanced. In other words, heat which is generated when the controller 234 operates as a transformer and a converter is efficiently dissipated.

According to the above-described embodiment, in the air flow generated by rotation of the fan 232, the air serves as cooling air to cool the dust collector motor 231 and the controller 234 after passing through the filter 226. The dust is captured by the filter 226, and the air having passed through the filter 226 as clean air cools the dust collector motor 231 and the controller 234. Therefore, the influence of dust on the dust collector motor 231 and the controller 234 is suppressed.

According to the above-described embodiment, even after the hammer drill 101 stops driving, the dust collector 200 continues driving. Specifically, the dust generated by machining the workpiece is collected by the dust collector 200 even after completion of the machining operation. Therefore, the dust is rationally collected by the dust collector 200.

According to the above-described embodiment, when located at the sealing position, the opening sealing part 167 is flush with the opening edge of the opening 161, so that any space which allows dust to be accumulated is not formed in the opening 161. Therefore, dust is prevented from entering the female connector 154 when the male plug 233 pushes the opening sealing part 167. This effect is obtained unless a recess in which dust may be accumulated is formed in the opening 161. Therefore, the sealing position may also include a position where the opening sealing part 167 protrudes from the opening 161 to the outside of the female connector 154.

According to the above-described embodiment, the opening sealing part 167 is moved in both the front-back (longitudinal) direction of the female connector 154 (the longitudinal direction of the hammer drill 101) and the transverse (crossing) direction crossing the longitudinal direction (the transverse direction of the hammer drill 101). Specifically, the opening sealing part 167 is moved in an oblique direction with respect to the longitudinal direction. If it is configured such that the opening sealing part 167 is moved only in the longitudinal direction, the opening sealing part 167 blocks entry of the male plug. If it is configured such that the opening sealing part 167 is moved only in the transverse direction, a recess in which dust is easily accumulated is formed in the opening 161. In this embodiment, however, it is configured such that the opening sealing part 167 is moved in an oblique direction with respect to the longitudinal direction. Therefore, the opening sealing part 167 is rationally moved in the longitudinal direction to seal and open the opening 161 and in the transverse direction to allow entry of the male plug 233 when the male plug 233 is inserted into the opening 161.

According to the above-described embodiment, when the dust collector 200 is attached to the hammer drill 101, the opening sealing part 167 is moved from the sealing position to the open position. With such a structure, the timing when the opening sealing part 167 opens the opening 161 is optimized.

In the above-described embodiment, it is configured such that the dust collector 200 is attached to the hammer drill 101 by engaging with the guide groove 151 and the handle 109 of the hammer drill 101, but it may be configured otherwise. For example, it may be configured such that the dust collector 200 is attached only to the handle 109 of the hammer drill 101 and fixedly held with respect to the hammer drill 101.

In the above-described embodiment, it is configured such that the male plug 233 comes in contact with the opening sealing part 167 and moves the opening sealing part 167, but it may be configured otherwise. For example, the dust collector 200 may have a member other than the male plug 233 which comes in contact with the movable part 165 and moves the movable part 165. Further, the hammer drill 101 may be provided with a movable part control member for moving the movable part 165, a control device for controlling the movable part control member, and a detecting means for detecting attachment of the dust collector 200. In this case, in attaching the dust collector 200, the detecting means detects that the guide rail 251 of the dust collector 200 is engaged with the guide groove 151 of the hammer drill 101, and based on the detection result, the control device controls the movable part control member to move the movable part 165.

In the above-described embodiment, it is configured such that the male plugs 233 are electrically connected to the metal terminals 156 of the female connector 154, but it may be configured otherwise. Specifically, the male plugs 233 and the female connector 154 may not be electrically connected but only mechanically connected to each other. In this case, the dust collector 200 is provided as an auxiliary machine and held with respect to the hammer drill 101 by mechanical engagement between the male plugs 233 and the female connector 154.

In the above-described embodiment, the dust collector 200 is explained as a representative example of the auxiliary machine attached to the power tool of the present invention. As the auxiliary machine, however, a lighting device for illuminating a working area, a laser irradiation device for displaying a horizontal line and/or a vertical line by laser irradiation, or an information display for displaying information relating to the state of the hammer drill 101 may also be used.

In the above-described embodiment, the present invention is applied to the hammer drill as a representative example of the power tool, but, for example, the present invention may also be applied to power tools in which dust is generated by machining a workpiece, such as an electric hammer, an electric drill, a multipurpose tool and a cutting tool.

In view of the nature of the above-described invention, the dust collector and the power tool according to this invention can be provided with the following features. Each of the features can be used separately or in combination with the other, or in combination with the claimed invention.

(Aspect 1)

The handle connection part is connected to the handle of the power tool, so that the dust collector is fixedly attached to the handle.

(Aspect 2)

The body has a dust collector motor, a fan that is rotated by the dust collector motor, a tool body connection part that is connected to the tool body of the power tool, and a handle connection part that is connected to the handle of the power tool.

(Aspect 3)

The handle connection part has a male terminal, the handle has a female terminal that engages with the male terminal, and power is supplied from the handle to the dust collector when the male terminal is connected to the female terminal.

(Aspect 4)

The tool body of the power tool has a dust collector mounting part that extends in parallel to an extending direction of the driving axis of the tool accessory, the tool body connection part of the dust collector has an engagement part that engages with the dust collector mounting part so as to be slidable in the extending direction of the driving axis, the handle has a dust collector connection part to which the handle connection part of the dust collector is connected, and by sliding the engagement part from the tool accessory side toward the handle side in parallel to the extending direction of the driving axis with respect to the dust collector mounting part, the male terminal and the female terminal are engaged and electrically connected to each other, so that attachment of the dust collector to the power tool and engagement between the male terminal and the female terminal are completed substantially at the same time.

(Aspect 5)

One of the dust collector mounting part and the engagement part comprises a recess extending in the extending direction, and the other of the dust collector mounting part and the engagement part comprises a projection that engages with the recess.

(Aspect 6)

In an extending direction of a rotation axis of the dust collector motor, the dust collecting part is connected to one side of the body and the handle connection part is provided on the other side of the body, and the fan is arranged on the dust collecting part side with respect to the dust collector motor in the extending direction of the rotation axis of the dust collector motor.

(Aspect 7)

The dust collector as defined in aspect 6, wherein:

the dust collector motor is disposed within the body such that the rotation axis of the dust collector motor is substantially parallel to the driving axis of the tool accessory when the dust collector is attached to the power tool, the handle connection part has a male terminal that protrudes from the body in the extending direction of the rotation axis of the dust collector motor, the handle has a female terminal that is engaged with the male terminal and electrically connected to the male terminal, and by sliding the dust collector with respect to the tool body in parallel to the extending direction of the rotation axis of the dust collector motor, attachment of the dust collector to the power tool and engagement between the male terminal and the female terminal are completed substantially at the same time.

(Aspect 8)

The sealing position is a position where the opening sealing part is aligned with the partition wall in the crossing direction.

(Aspect 9)

The sealing position is a position where the opening sealing part is aligned with the partition wall on a rear side of the partition wall when the female part is viewed from the opening part side in the longitudinal direction.

(Aspect 10)

The opening sealing part has an inclined surface extending in an oblique direction to the longitudinal direction.

(Aspect 11)

The opening has an inclined surface extending in an oblique direction to the longitudinal direction.

(Aspect 12)

The inclined surface of the opening sealing part is substantially parallel to the inclined surface of the opening.

(Aspect 13)

The dust collector is fixedly attached to the handle by connection of the handle connection part to the handle of the power tool.

(Aspect 14)

The body has a tool body connection part that houses a dust collector motor and a fan and is connected to the tool body of the power tool, and a handle connection part that is connected to the handle of the power tool.

(Aspect 15)

The tool body of the power tool has a dust collector mounting part that extends in parallel to an extending direction of the driving axis of the tool accessory, the tool body connection part of the dust collector has an engagement part that engages with the dust collector mounting part so as to be slidable in the extending direction of the driving axis, the handle has a dust collector connection part to which the handle connection part of the dust collector is connected, and by sliding the engagement part from the tool accessory side toward the handle side in parallel to the extending direction of the driving axis with respect to the dust collector mounting part, the male terminal and the female terminal are engaged and electrically connected to each other, so that attachment of the dust collector to the power tool and engagement between the male terminal and the female terminal are completed substantially at the same time.

(Aspect 16)

One of the dust collector mounting part and the engagement part comprises a recess extending in the extending direction, and the other of the dust collector mounting part and the engagement part comprises a projection that engages with the recess.

(Aspect 17)

The controller has a heat radiating plate, and the heat radiating plate forms at least part of the airflow path.

(Aspect 18)

The airflow path is formed between the dust collector motor and the controller in a direction perpendicular to a direction in which air flows through the airflow path.

(Aspect 19)

Air is sucked in through the opening of the dust collecting part and is discharged to the outside of the dust collector after passing through the filter, the controller and the fan in order within the airflow path.

(Aspect 20)

The controller is arranged between the filter and the fan in the direction of the rotation axis of the dust collector motor.

(Aspect 21)

The power tool to which the dust collector is attached has:

a tool body having a front end region to which the tool accessory is coupled, a driving mechanism motor that is housed in the tool body, a driving mechanism that is driven by the driving mechanism motor and drives the tool accessory, and a handle that is connected to a rear end region of the tool body distant from the front end region in a driving axis extending direction in which a driving axis of the tool accessory extends, and extends in a crossing direction crossing the driving axis extending direction, the dust collector has:

a dust collecting part having an opening for collecting dust, and a handle connection part that is connected to the dust collecting part and the handle of the power tool, and the dust collector is attached to the power tool by connecting the handle connection part to the handle.

(Aspect 22)

The dust collector is supplied with power from the handle via the handle connection part so that the dust collector motor is driven.

(Aspect 23)

The power tool with the dust collector, wherein:

the power tool has an AC motor for driving the tool accessory and is configured such that the AC motor is driven by an AC current supplied from an external power source, the dust collector is configured such that an AC current is supplied via the power tool, the dust collector motor is configured as a DC motor, and the controller serves as a convertor for converting the AC current into a DC current.

Correspondences Between the Features of the Embodiment and the Features of the Invention The above-described embodiment is a representative example for embodying the present invention, and the present invention is not limited to the constructions that have been described as the representative embodiment. Correspondences between the features of the embodiment and the features of the invention are as follow:

The hammer drill 101 is an example embodiment that corresponds to the "power tool" according to the present invention.

The driving motor 111 is an example embodiment that corresponds to the "driving mechanism motor" according to the present invention.

The cooling fan 112 is an example embodiment that corresponds to the "cooling fan" according to the present invention.

The body 103 is an example embodiment that corresponds to the "tool body" according to the present invention.

The motor housing 105 is an example embodiment that corresponds to the "tool body" according to the present invention.

The gear housing 107 is an example embodiment that corresponds to the "tool body" according to the present invention.

The opening 105a is an example embodiment that corresponds to the "outlet" according to the present invention.

The handle 109 is an example embodiment that corresponds to the "handle" according to the present invention.

The grip part 109A is an example embodiment that corresponds to the "grip part" according to the present invention.

The reinforcing part 109B is an example embodiment that corresponds to the "connection part" according to the present invention.

The protection space 261 is an example embodiment that corresponds to the "second space" according to the present invention.

The motion converting mechanism 113 is an example embodiment that corresponds to the "driving mechanism" according to the present invention.

The striking mechanism 115 is an example embodiment that corresponds to the "driving mechanism" according to the present invention.

The power transmitting mechanism 117 is an example embodiment that corresponds to the "driving mechanism" according to the present invention.

The trigger 109a is an example embodiment that corresponds to the "operation member" according to the present invention.

The trigger 109a is an example embodiment that corresponds to the "trigger" according to the present invention.

The guide groove 151 is an example embodiment that corresponds to the "first connection part" according to the present invention.

The engagement groove 153 is an example embodiment that corresponds to the "second connection part" according to the present invention.

The female connector 154 is an example embodiment that corresponds to the "second connection part" according to the present invention.

The dust collector 200 is an example embodiment that corresponds to the "dust collector" according to the present invention.

The body 201 is an example embodiment that corresponds to the "driving mechanism housing part" according to the present invention.

The body 201 is an example embodiment that corresponds to the "body" according to the present invention.

The body housing 201A is an example embodiment that corresponds to the "body" according to the present invention.

The dust collecting part 210 is an example embodiment that corresponds to the "dust collecting part" according to the present invention.

The opening 211 is an example embodiment that corresponds to the "opening" according to the present invention.

The dust transferring part 215 is an example embodiment that corresponds to the "dust transferring part" according to the present invention.

The storing part 225 is an example embodiment that corresponds to the "dust storing part" according to the present invention.

The filter 226 is an example embodiment that corresponds to the "filter" according to the present invention.

The controller 234 is an example embodiment that corresponds to the "controller" according to the present invention.

The airflow path S is an example embodiment that corresponds to the "airflow path" according to the present invention.

The dust collector motor 231 is an example embodiment that corresponds to the "dust collector motor" according to the present invention.

The fan 232 is an example embodiment that corresponds to the "fan" according to the present invention.

The guide rail 251 is an example embodiment that corresponds to the "tool body connection part" according to the present invention.

The guide rail 251 is an example embodiment that corresponds to the "engagement part" according to the present invention.

The latch 253 is an example embodiment that corresponds to the "tool body connection part" according to the present invention.

The engagement projection 252 is an example embodiment that corresponds to the "handle connection part" according to the present invention.

The male plug 233 is an example embodiment that corresponds to the "handle connection part" according to the present invention.

The stepped portion 201a is an example embodiment that corresponds to the "space forming part" according to the present invention.

The female connector 154 is an example embodiment that corresponds to the "female part" according to the present invention.

The metal terminal 156 is an example embodiment that corresponds to the "female terminal" according to the present invention.

The plug insertion part 160 is an example embodiment that corresponds to the "opening part" according to the present invention.

The opening 161 is an example embodiment that corresponds to the "opening" according to the present invention.

The dust collector 200 is an example embodiment that corresponds to the "auxiliary machine" according to the present invention.

The dust collector motor 231 is an example embodiment that corresponds to the "dust collector motor" according to the present invention.

The fan 232 is an example embodiment that corresponds to the "fan" according to the present invention.

The male plug 233 is an example embodiment that corresponds to the "male part" according to the present invention.

The male plug 233 is an example embodiment that corresponds to the "male terminal" according to the present invention.

DESCRIPTION OF THE NUMERALS 101 hammer drill
103 body
105 motor housing
105a opening
106 sliding guide
107 gear housing
107a bearing holding part
107b opening
108 bellows-like member
109 handle
109A grip part
109B reinforcing part
109C mounting part
109a trigger
109b engagement projection
109c trigger switch
110 mode changeover switch
111 driving motor
111a commutator
112 cooling fan
113 motion converting mechanism
115 striking mechanism
117 power transmitting mechanism
119 hammer bit
125 intermediate shaft
127 rotary body
129 swinging ring
131 cylindrical piston
131a air chamber
133 small-diameter gear
135 large-diameter gear
137 tool holder
137a bearing
143 striker
145 impact bolt
151 guide groove
152 body-side engagement part
153 engagement groove
154 female connector
155 connector body
156 metal terminal
157 first holding part
158 first inclined part
158a first guide surface
160 plug insertion part
161 opening
161a inclined surface
162 guide shaft
162a second inclined part
165 movable part
166 body
166a plug insertion hole
167 opening sealing part
167a inclined surface
168 second holding part
169 guide pin
170 coil spring
190 power cable
200 dust collector
201 body housing
201a stepped portion
201b stepped portion
210 dust collecting part
211 opening
215 dust transferring part
215a first transferring part
215b second transferring part
216 transfer hose
217 first extending part
218 second extending part
220 dust storing part
221a fixed part
221b movable part
222 pivot
223 latch
225 storing part
226 filter
230 driving part
231 dust collector motor
232 fan
233 male plug
233a plug holding part
233b coil spring
234 controller
250 mounting mechanism
251 guide rail
252 engagement projection
253 latch
255 handle connection part
260 heat radiation space
261 protection space
270 heat radiation space

The invention claimed is:

1. A dust collector configured to be removably attached to a power tool, the power tool being configured to perform a processing operation on a workpiece, the dust collector being configured to collect dust generated during the processing operation, the dust collector comprising:
a motor;
a fan configured to be rotationally driven by the motor to generate a flow of air;
a controller configured to control the motor;
a dust-collecting part having an opening configured to collect the dust during the processing operation;
a dust-storing part configured to store the dust collected through the opening; and a dust-transferring part configured to transfer the dust is transferred from the dust-collecting part to the dust-storing part, wherein:

the dust collector is configured such that the flow of the air generated by the fan is utilized to cool the controller, collect the dust through the dust-collecting part and transfer the dust to the dust-storing part.

2. The dust collector as defined in claim 1, further comprising:

a driving-mechanism-housing part connected to the dust-storing part, the driving-mechanism-housing part housing the motor and the controller; and a filter between the dust-storing part and the driving-mechanism-housing part, wherein:

the dust-storing part, the filter and the controller are configured such that the flow of air which has transferred the dust to the dust-storing part and passed through the filter cools the controller.

3. The dust collector as defined in claim 2, wherein the driving-mechanism-housing part communicates with the dust-storing part via the filter.

4. The dust collector as defined in claim 3, wherein the controller is between the filter and the fan.

5. The dust collector as defined in claim 4, wherein:

the driving-mechanism-housing part has an airflow path through which the air flows from the filter to the fan; and the controller is at least a portion of a wall defining the airflow path, so that the air flows along a surface of the controller.

6. The dust collector as defined in claim 5, wherein:

the controller is radially outward of the motor, and at least a portion of the air flow path extends between the motor and the controller in an axial direction of an output shaft of the motor.

7. The dust collector as defined in claim 6, wherein:

the controller has a heat radiating plate, and the heat radiating plate forms at least the portion of the wall defining the airflow path.

8. The dust collector as defined in claim 2, wherein the controller is between the filter and the fan.

9. The dust collector as defined in claim 8, wherein:

the driving-mechanism-housing part has an airflow path through which the air flows from the filter to the fan; and the controller is at least a portion of a wall defining the airflow path, so that the air flows along a surface of the controller.

10. The dust collector as defined in claim 9, wherein:

the controller has a heat radiating plate, and the heat radiating plate forms at least the portion of the wall defining the airflow path.

11. The dust collector as defined in claim 8, wherein:

the controller is between the filter and the fan in an axial direction of an output shaft of the motor.

12. The dust collector as defined in claim 2, wherein:

the controller is radially outward of the motor, and the motor, the controller and the filter are configured such that the air which has passed through the filter flows between the motor and the controller in an axial direction of an output shaft of the motor.

13. The dust collector as defined in claim 1, wherein:

the motor is a DC motor, and the controller is a transformer configured to transform power supplied from an external power source and to supply the power to the motor.

14. The dust collector as defined in claim 1, wherein:

the power tool is configured to operate by power supplied from an external power source, the dust collector is configured to operate by power supplied from the power tool, the motor is a DC motor, and the controller is a convertor configured to convert an alternate current supplied from the external power source into a direct current.

15. The dust collector as defined in claim 1, wherein:

the controller is electrically connectable to the power tool, and the controller is configured to receive a signal outputted from the power tool and to control the motor based on the signal.

16. The dust collector as defined in claim 15, wherein:

the power tool includes an operation member configured to be operable by a user and to be switched between an on-state and an off-state in response to an operation by the user, the power tool being configured to be driven in the on-state and to stop driving of the power tool in the off-state;

the power tool is configured to output a drive signal to the dust collector when the operation member is switched to the on-state and to output a stop signal to the dust collector when the operation member is switched to the off-state; and the controller is configured to start driving of the motor upon receiving the drive signal and to stop driving of the motor when a prescribed time elapses after receiving the stop signal.

* * * * *